United States Patent [19]

Carriere

[11] Patent Number: 5,180,346
[45] Date of Patent: Jan. 19, 1993

[54] T-DRIVE POWERTRAIN ASSEMBLY FOR AUTOMOTIVE VEHICLE WITH FORWARD DISPOSITION OF THE AXIS FOR THE FORWARD TRACTION WHEELS

[75] Inventor: Donald L. Carriere, Livonia, Mich.

[73] Assignee: Ford Motor Company, Dearborn, Mich.

[21] Appl. No.: 733,949

[22] Filed: Jul. 22, 1991

[51] Int. Cl.[5] .......................... B60K 5/04; B60K 17/00
[52] U.S. Cl. ..................................... 475/200; 475/198; 475/201; 74/424
[58] Field of Search .............. 475/200, 198, 201, 203, 475/204; 74/424

[56] References Cited

U.S. PATENT DOCUMENTS

| 3,307,429 | 3/1967 | Lynes | 475/200 |
|---|---|---|---|
| 4,056,988 | 11/1977 | Kubo et al. | 475/200 X |
| 4,319,499 | 3/1982 | Sanui et al. | 475/200 |
| 4,509,389 | 4/1985 | Vahratian et al. | 74/695 |
| 4,638,686 | 1/1987 | Lemieux et al. | 475/204 X |
| 4,726,254 | 2/1988 | Kubo et al. | 475/200 X |
| 4,899,621 | 2/1990 | Sakakibara | 475/200 X |
| 4,974,473 | 12/1990 | Hatakeyama | 475/200 X |

FOREIGN PATENT DOCUMENTS

| 207345 | 4/1957 | Austria | 475/198 |
|---|---|---|---|
| 654326 | 3/1934 | Fed. Rep. of Germany . | |
| 55-44026 | 3/1980 | Japan | 475/200 |
| 56-20861 | 2/1981 | Japan . | |
| 63-270967 | 11/1988 | Japan | 475/200 |

Primary Examiner—Leslie A. Braun
Assistant Examiner—Ryan W. Massey
Attorney, Agent, or Firm—Roger L. May; Frank G. McKenzie

[57] ABSTRACT

A T-drive power transmission mechanism comprising an engine with a crankshaft disposed perpendicularly with respect to the axis of the transmission gearing, the transmission including a hydrokinetic torque converter and a right angle drive connecting the torque output element of the gearing with transverse axle halfshafts, the torque input element of the gearing being connected drivably to a crankshaft gear located at the midpoint of the crankshaft.

18 Claims, 18 Drawing Sheets

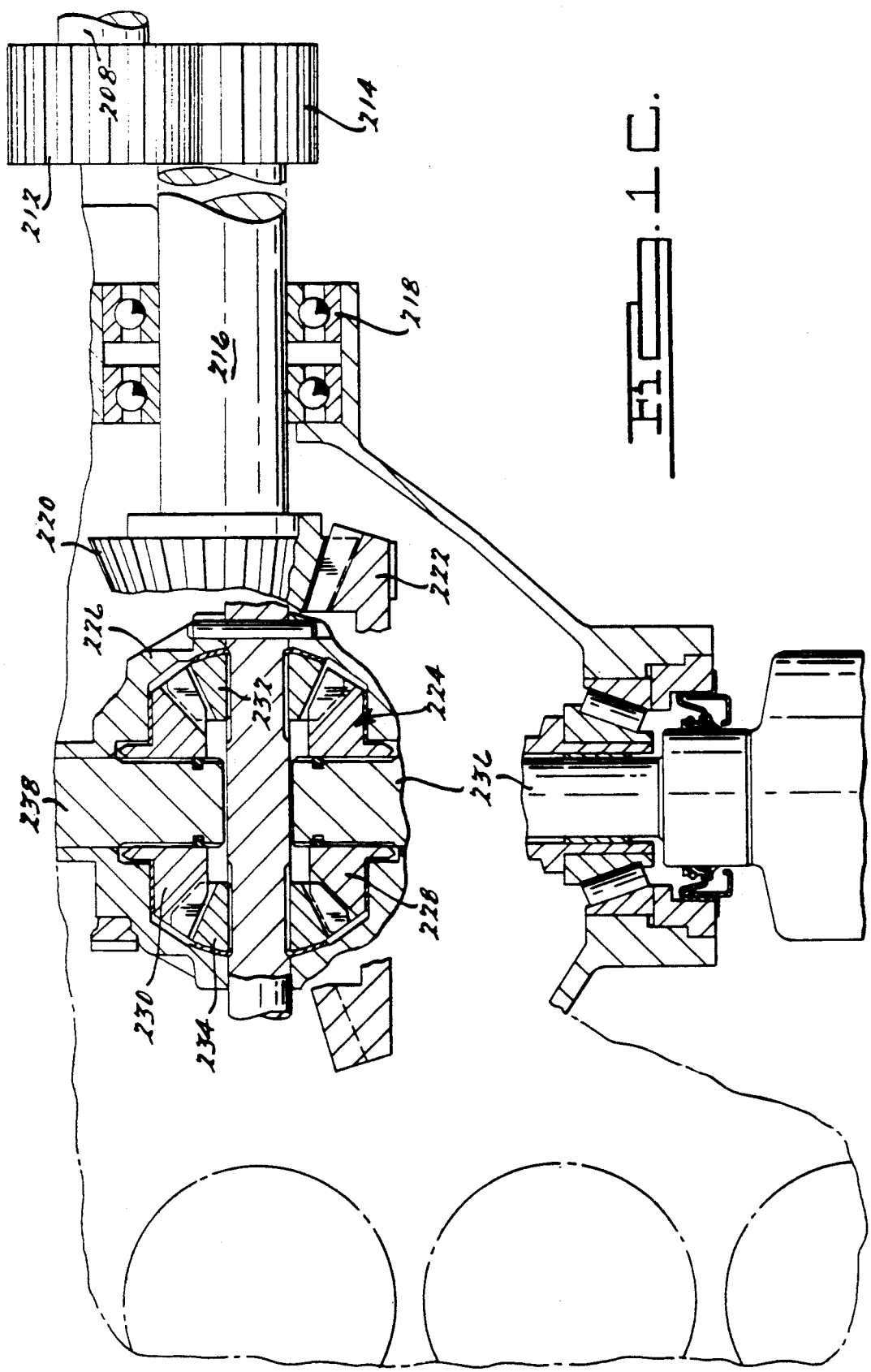

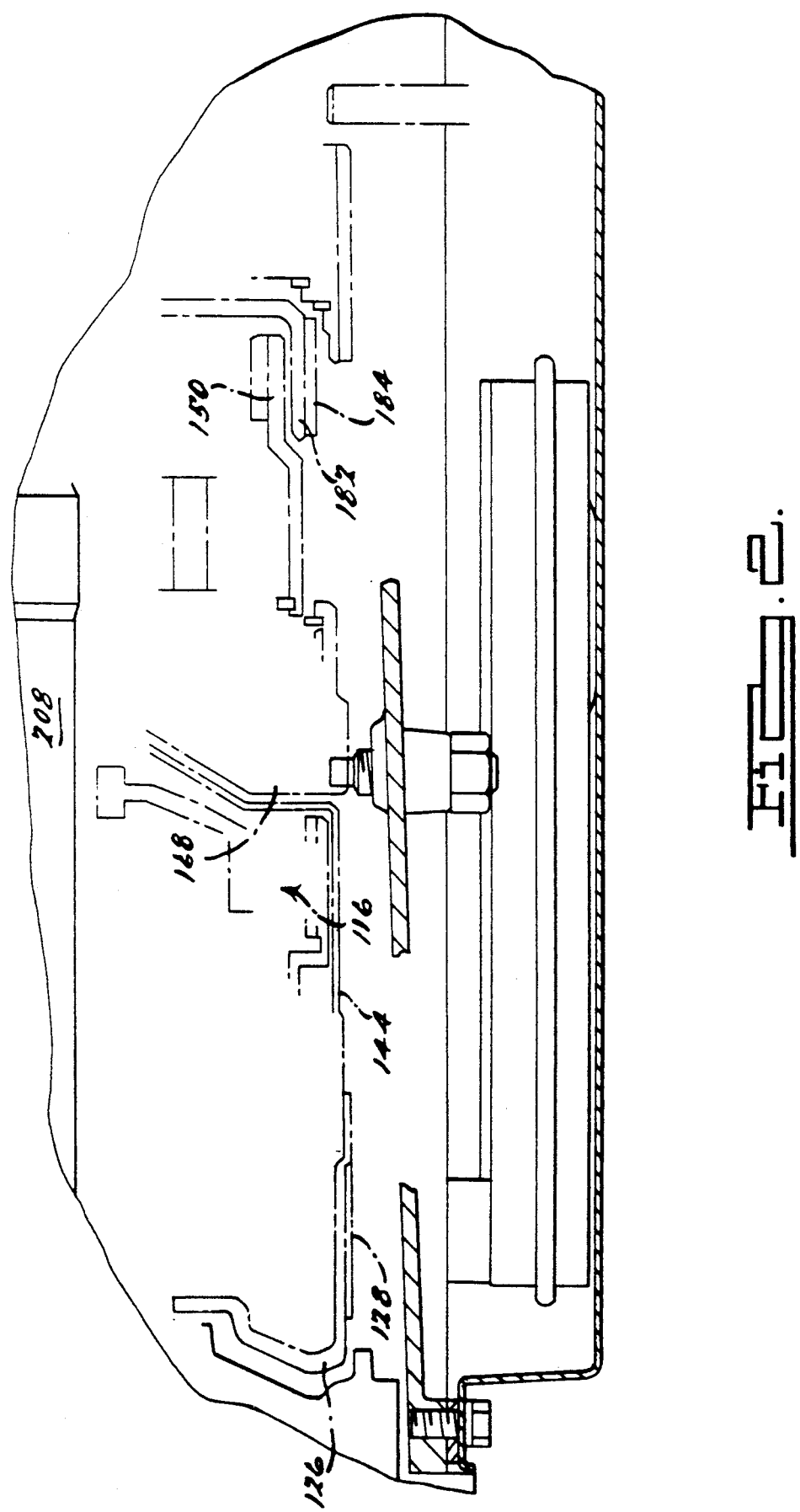

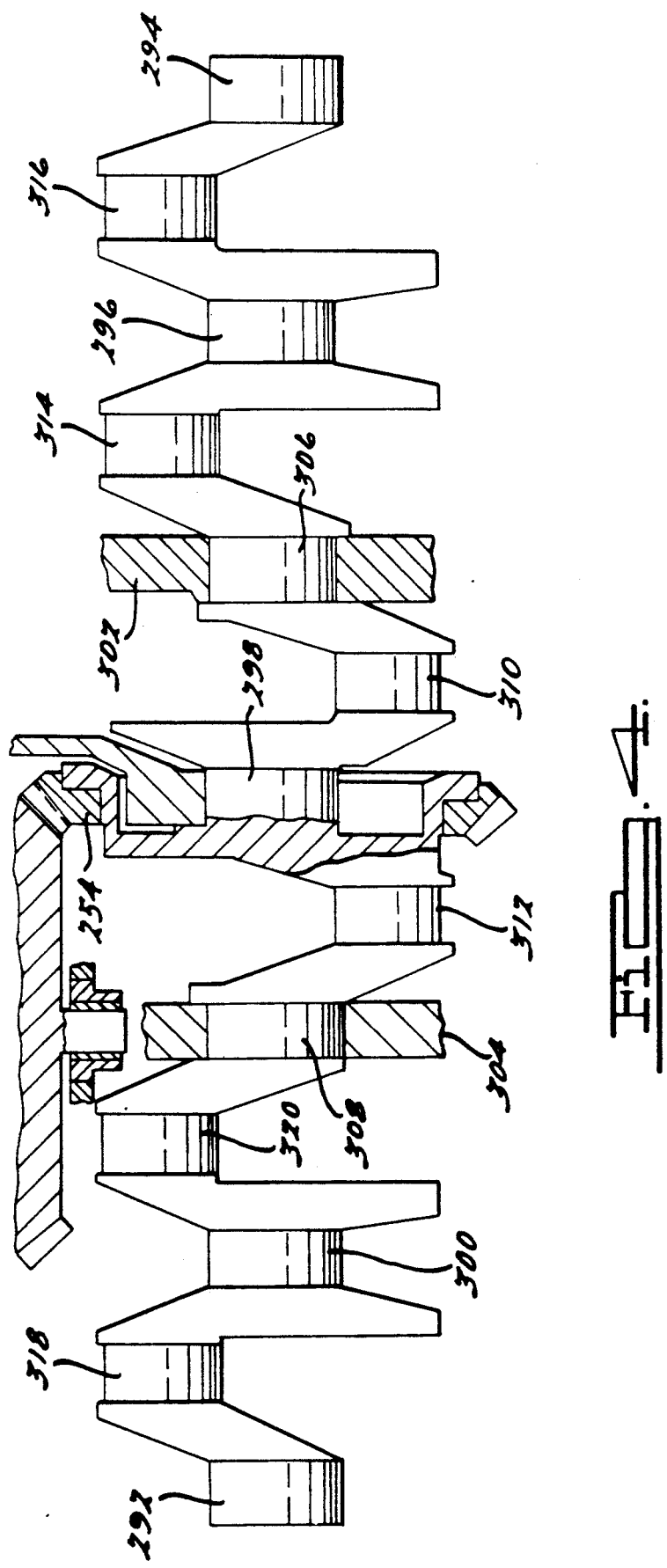

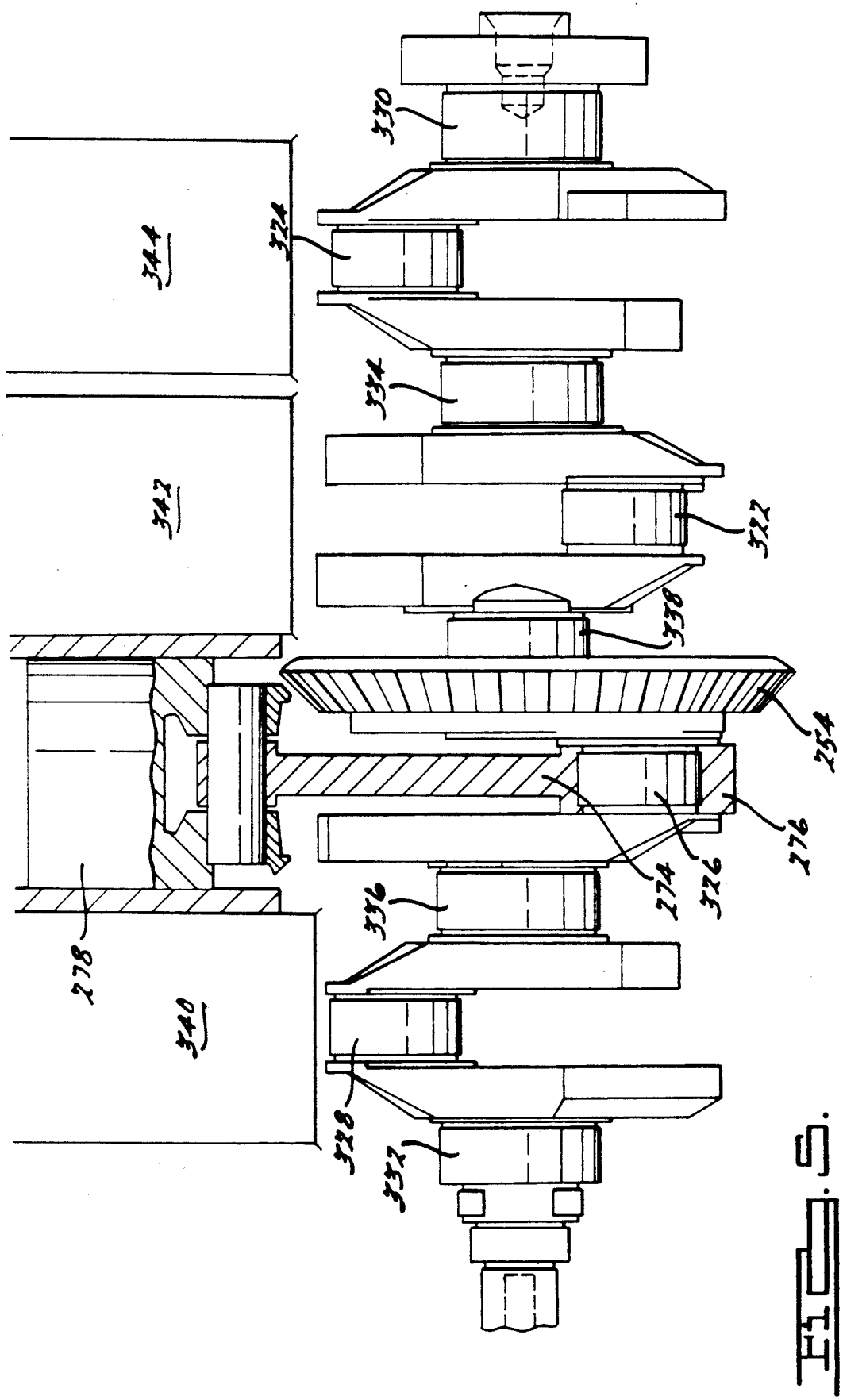

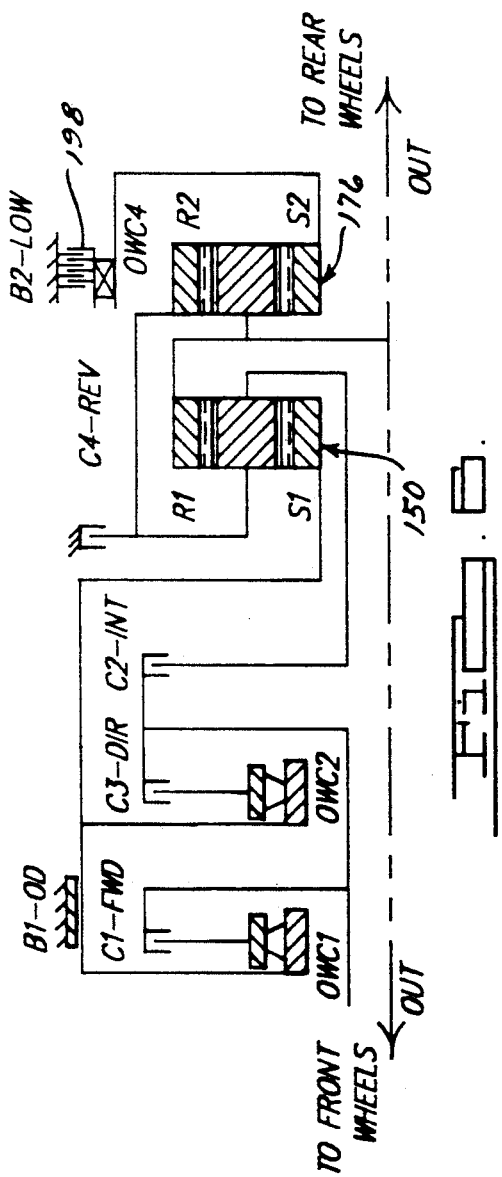

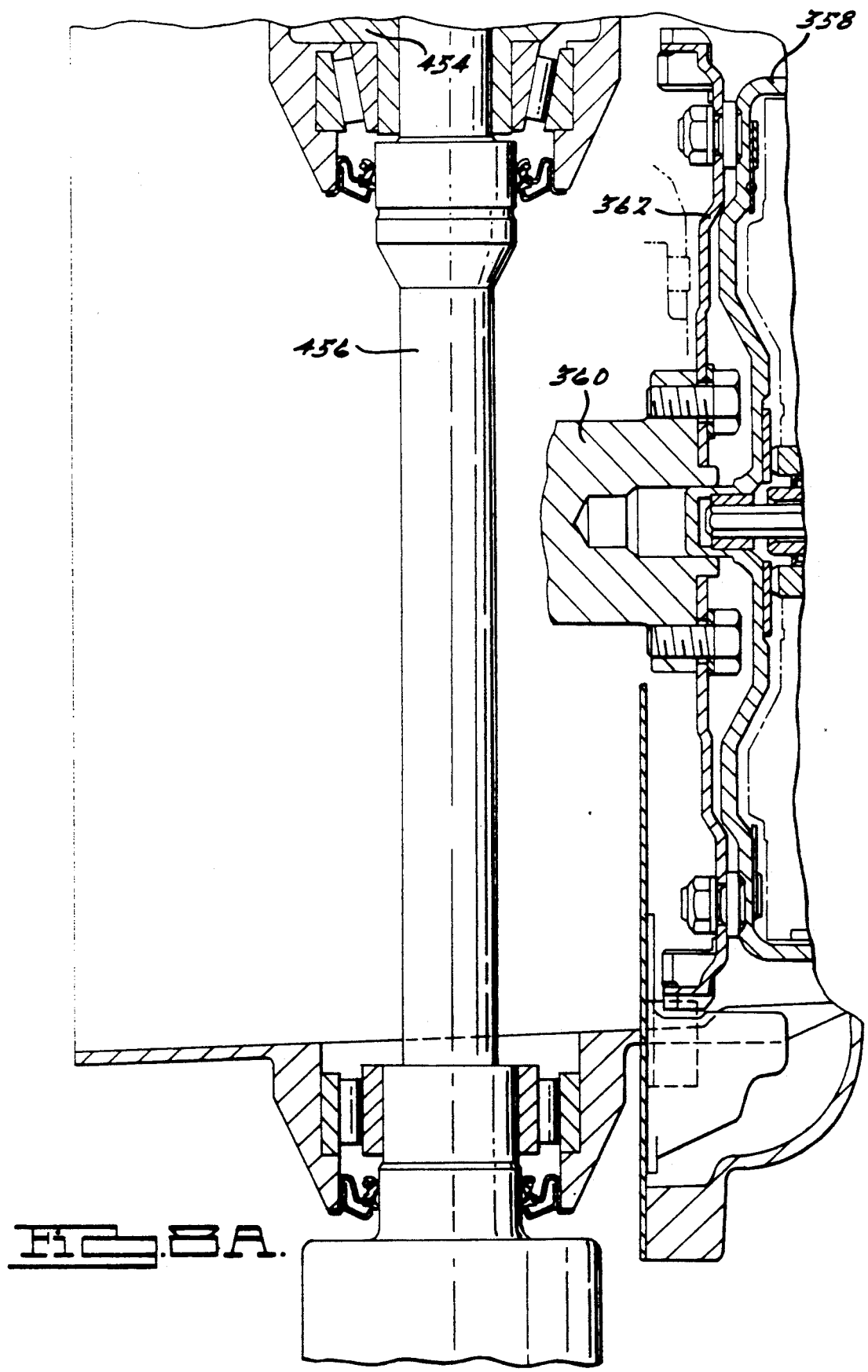

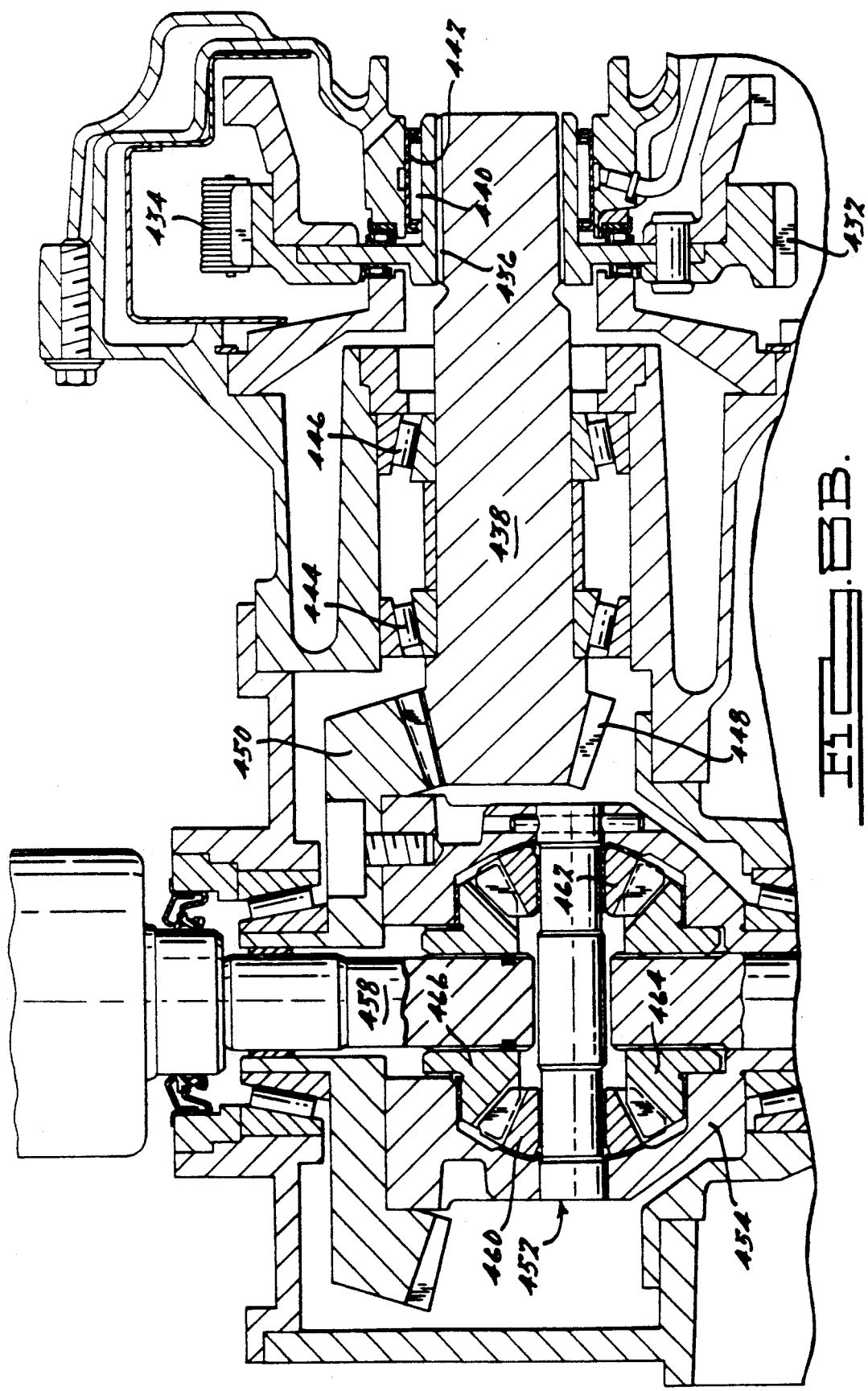

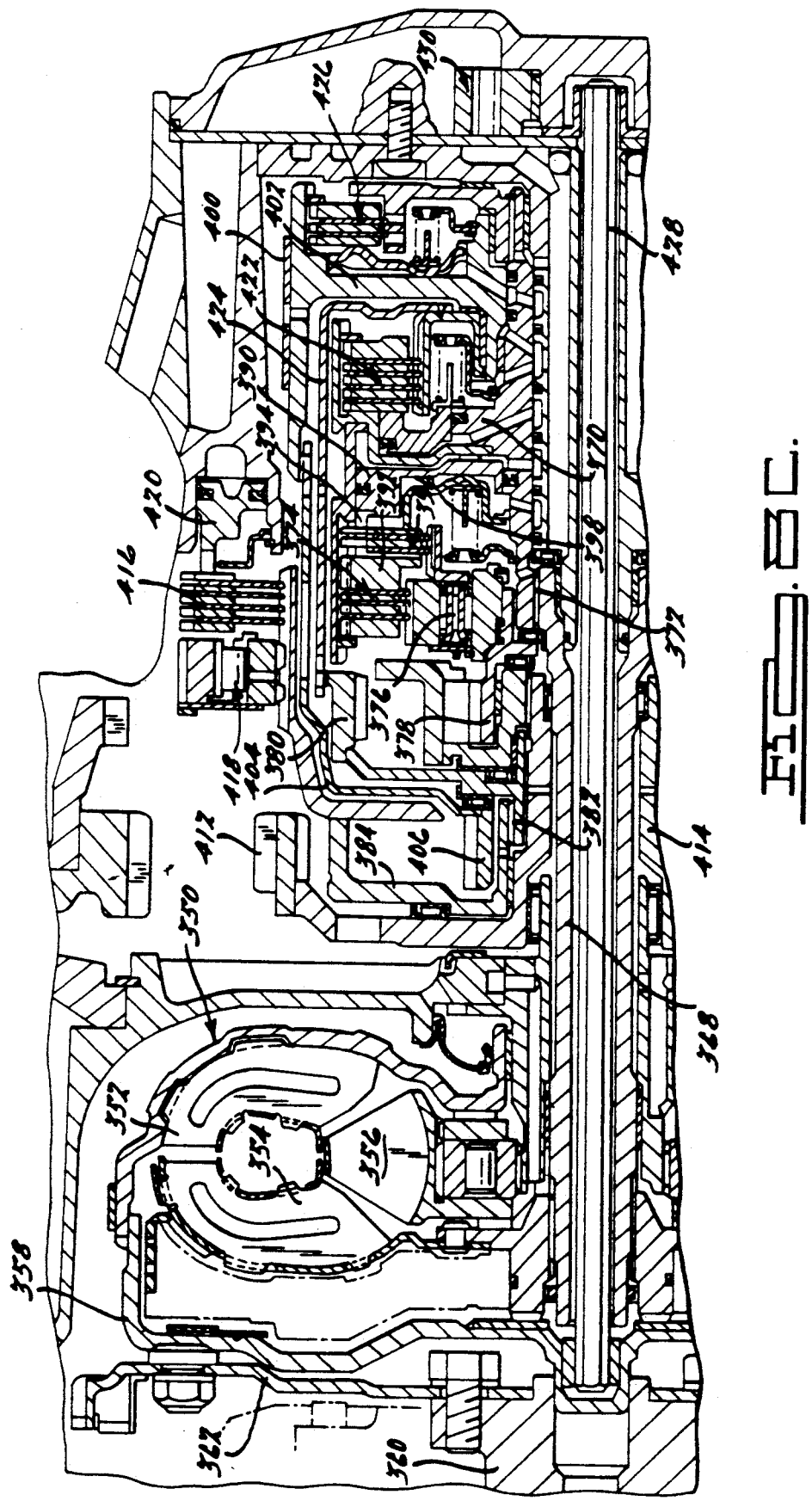

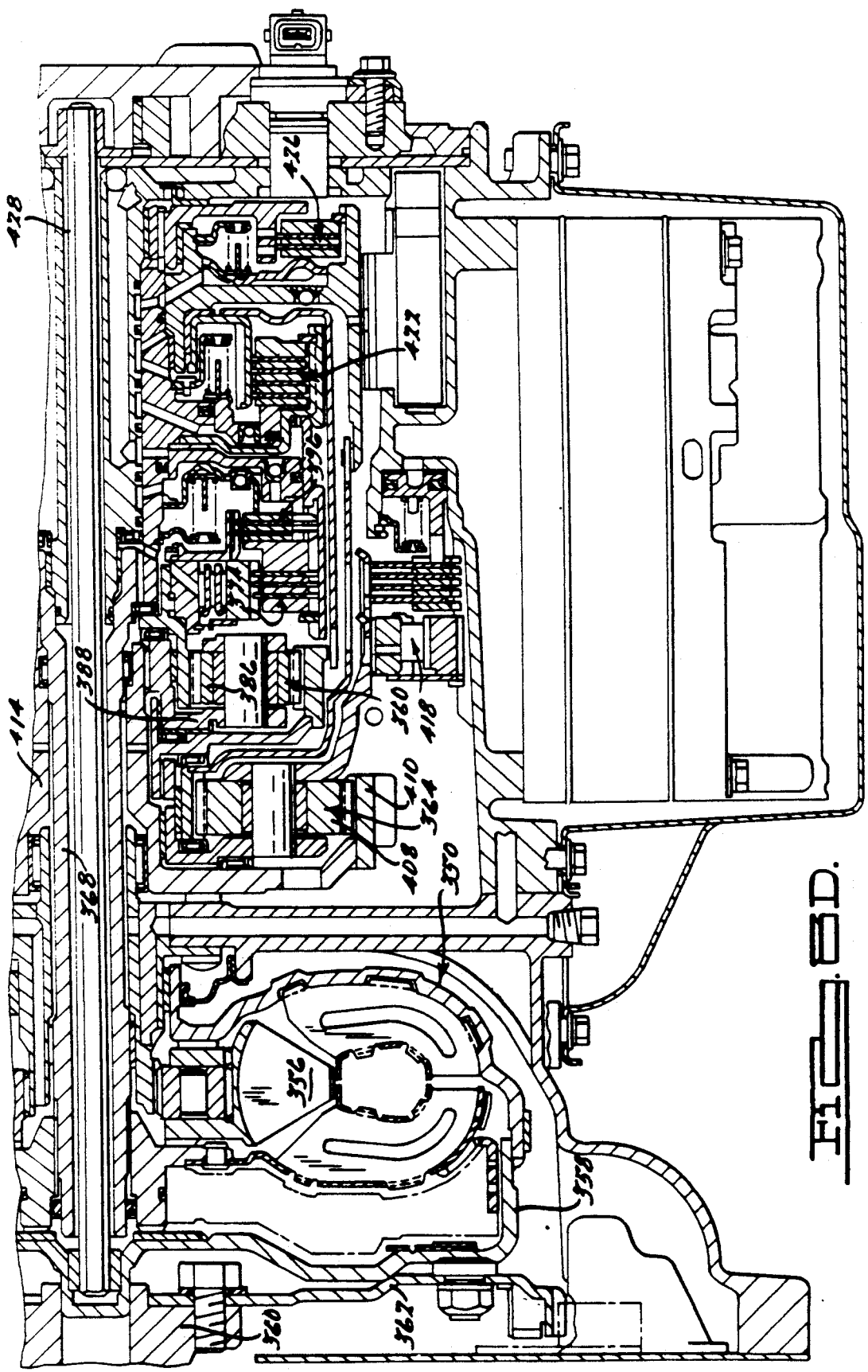

FIG. 10

| GEAR | RC | CC | FC | DC | L/R | OWC2 | | OWC1 | | RATIO | COAST BRAK'G |
|---|---|---|---|---|---|---|---|---|---|---|---|
| | | | | | | DR | CO | DR | CO | | |
| M-1 | | X | X | | X | X | — | X | — | 2.889 | YES |
| M-2 | | X | X | | | X | — | OR | OR | 1.571 | YES |
| M-3 | | X | X | X | | X | — | OR | OR | 1.000 | YES |
| 1ST | | | X | | | X | OR | X | OR | 2.889 | NO |
| 2ND | | | X | X | | X | OR | OR | OR | 1.571 | NO |
| 3RD | | | X | X | | X | OR | OR | OR | 1.000 | NO |
| 4TH | | | X | | | OR | OR | OR | OR | .689 | YES |
| REV. | X | | | | X | — | — | — | — | 2.310 | YES |

T-DRIVE POWERTRAIN ASSEMBLY FOR AUTOMOTIVE VEHICLE WITH FORWARD DISPOSITION OF THE AXIS FOR THE FORWARD TRACTION WHEELS

TECHNICAL FIELD

My invention relates to power transmission mechanisms for automotive vehicles having an internal combustion engine wherein the engine and the transmission mechanism form a common powertrain assembly with the axis of the engine arranged transversely with respect to the geometric axis of the transmission mechanism to for a "T" configuration.

BACKGROUND OF THE INVENTION

My invention comprises an improvement in the invention disclosed in my copending application, U.S. Ser. No. 471,759, filed Jan. 29, 1990. That application is assigned to the assignee of this invention.

The powertrain assembly of my copending patent application, as well as the powertrain assembly of my present invention, comprises an internal combustion engine with a crankshaft axis situated in a transverse direction with respect to the centerplane of the vehicle. The assembly is mounted within the forward engine compartment. It includes also multiple ratio gearing having a gearing axis disposed perpendicularly with respect to the crankshaft axis wherein the axis of the gearing defines a "T" configuration with respect to the engine crankshaft axis. A geared connection is provided between the torque input side of the multiple ratio gearing and the engine crankshaft, the geared connection including a crankshaft bevel gear located between the crankshaft ends. The crankshaft gear engages directly a torque input pinion for the transmission, thus making it possible to reduce to a minimum the overall longitudinal dimensions in the north-south direction for the powertrain package. For any given road clearance, the profile of the powertrain package is also reduced with respect to the corresponding profile of a conventional engine and transaxle assembly of the kind shown, for example, in prior art U.S. Pat. No. 4,509,389, which is assigned to the assignee of my invention.

Examples of cross-axis drives for automotive vehicles are found in prior art references that are discussed in my copending application including a publication entitled Auto Notizie, published in May of 1989 by Cizeta Moroder, a company of Italy. Another example of a prior art construction of a T-drive powertrain assembly is shown in Japanese Patent Publication 56-20861, dated Feb. 26, 1981.

It is difficult, if not impossible, for an automotive designer to develop an optimum profile for improved aerodynamics and reduced vehicle weight if he were to incorporate vehicle powertrain designs such as those illustrated in the prior art references described in my copending application. Powertrains of such known constructions would be characterized by an undesirable space penalty that would force the designer to compromise the vehicle design to provide necessary space in the engine compartment for the powertrain assembly while maintaining necessary cargo and passenger space.

SUMMARY OF THE INVENTION

The vehicle length for a vehicle incorporating the improved powertrain of my invention can be reduced relative to prior art designs while maintaining energy absorbing characteristics that are necessary during a front-end vehicle crash.

As in the case of the T-drive design disclosed in my copending application, the improved T-drive design of my present invention includes a bevel gear situated at a strategic position on the engine crankshaft. A relatively large pitch diameter crankshaft gear and transmission input pinion are arranged in meshing cross-axis driving relationship in such a way that gear tooth loading is reduced while providing acceptable pitch line speeds at the mesh points for the gear teeth. In the case of the T-drive assembly of my copending application, the crankshaft gear is located at a position displaced from the midpoint of the crankshaft, the amount of the displacement being approximately equal to the pitch radius of the torque input bevel gear for the transmission with which the crankshaft gear meshes.

The crankshaft gear for my present design, as well as for the design of my copending application, is located at an effective nodal point for the first natural torsional frequency for the two crankshaft portions situated on either side of the crankshaft gear. One crankshaft portion in the case of the design of my copending application is longer than the other because of the offset that is necessary to accommodate the pitch radius of the torque input gear for the transmission. Although the first natural torsional frequency for each crankshaft portion for the design of my copending application is less than the first natural torsional frequency of a crankshaft in which the gear is located at one end of the crankshaft, the first natural torsional frequency for one crankshaft portion is greater than it would be if it were possible to locate the crankshaft gear at the center of the crankshaft.

In accordance with my present invention, it is possible to arrange the engine crankshaft in a transverse direction with the axis of the transmission gearing extending in a longitudinal direction with respect to the center plane of the vehicle without requiring the crankshaft gear to be located off the mid-center position. Thus, the effective stiffness characteristic of the crankshaft portions in my improved design is improved relative to the stiffness characteristic of the design disclosed in my copending application. It also is possible for the crankshaft to be made lighter because of the reduced stiffness requirement.

In addition to the foregoing advantage with respect to the crankshaft stiffness, my present design makes it possible to achieve a better balance of dynamic force couples during operation relative to the corresponding balance characteristics of the design of my copending application. This improved balance is due in part to the equating of the natural torsional frequencies of the crankshaft portions situated on either side of the crankshaft gear when the crankshaft gear is located at a midposition.

The transmission mechanism of our powertrain assembly includes multiple planetary gear elements situated on a main transmission axis and a hydrokinetic torque converter situated on an axis in parallel disposition with respect to the transmission axis, the latter being perpendicularly disposed with respect to the engine crankshaft axis. A torque transfer drive is used to transfer turbine torque of the hydrokinetic torque converter from one axis to the other as the impeller of the hydrokinetic torque converter is driven by the transmission input gear that meshes with the crankshaft gear.

Displacing the hydrokinetic torque converter axis from the mid-position of the crankshaft gear in this manner will not result in an undesirable increase in the overall transverse dimension of the powertrain housing because the offset between the axis of the planetary gear assembly and the axis of the hydrokinetic torque converter compensates for the offset between the converter axis and the crankshaft gear.

According to one embodiment of our improved powertrain assembly, a front-wheel drive differential is situated between the engine and the hydrokinetic torque converter. Front-wheel drive half shafts are connected drivably to side gears of the differential. The offset between the converter and the planetary gearing makes it possible for the final drive torque output shaft to extend across the center plane of the converter from a torque output pinion of the multiple ratio planetary gearing to the torque input ring gear of the front axle differential without interference and with an economy of space. This does not result in an increase of the transverse dimensions of the powertrain housing.

According to another feature of my invention, I have made provision for locating a transaxle differential gear system for my improved powertrain assembly at a location between the engine and the torque converter of the automatic transmission that forms a part of the powertrain assembly. This makes it possible to reduce the fore-and-aft distance between the engine crankshaft axis and the axis of the torque output shafts for the final drive differential of the transaxle. This reduces front-end overhang for the vehicle and permits a shortening of the overall vehicle length while permitting a reduced profile height.

We have made provision also in this embodiment of the invention for transferring torque through a torque transfer drive between the power output element of the multiple ratio gearing and the torque input ring gear of the final drive differential assembly of the transaxle while avoiding interference between the torque converter structure and the torque transfer members that distribute torque to the final drive differential.

BRIEF DESCRIPTION OF THE FIGURES OF THE DRAWING

FIGS. 1A, 1B and 1C, taken together, show a cross-sectional view of a forward portion of a powertrain assembly adapted for a front-wheel drive vehicle embodying the improved T-drive configuration of my invention.

FIG. 2 is a cross-sectional assembly view of a portion of the planetary gearing shown in FIGS. 1E, 1F and 1G as seen from the plane of section line 2—2 of FIGS. 1E, 1F and 1G.

FIG. 4 is an illustration of a crankshaft, shown partly in elevation, for a six-cylinder engine wherein the crankshaft gear is situated at a mid-position the crankshaft axis.

FIG. 5 is a four-cylinder engine crankshaft showing a mid-position crankshaft gear, together with a schematic illustration of a piston and piston rod which cooperate with a crank portion of the crankshaft.

FIG. 6 is a schematic line diagram of the planetary gear portion of the gearing assembly illustrated in FIGS. 1E, 1F and 1G. The gearing assembly includes alternate torque output shafts FIG. 7 is a chart that shows the clutch and brake engagement and release pattern for the planetary gearing shown schematically in FIG. 6.

FIGS. 8A, 8B and 8C, taken together, show an alternate embodiment of my invention which includes a four-speed ratio planetary gear system wherein the axis of the gearing coincides with the axis of the transmission input gear and wherein the transaxle differential gearing is located between the hydrokinetic torque converter of the transmission and the engine.

FIG. 9 is a schematic representation of the transmission planetary gearing of FIGS. 8A, 8B and 8C.

FIG. 10 is a chart that shows the clutch and brake engagement and release pattern for the planetary gearing of FIG. 9.

PARTICULAR DESCRIPTION OF THE INVENTION

Figure 1A:
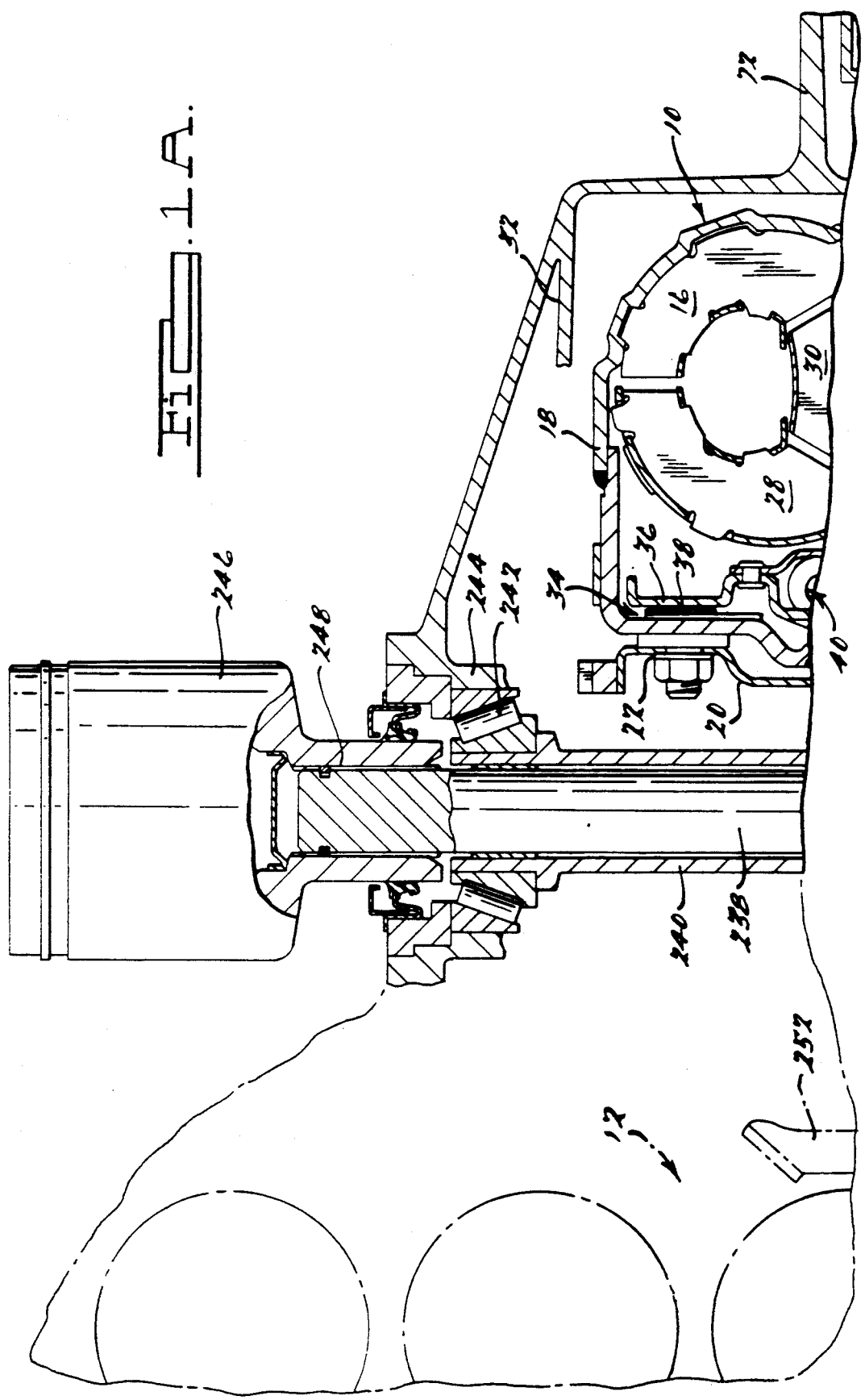
Figure 1B:
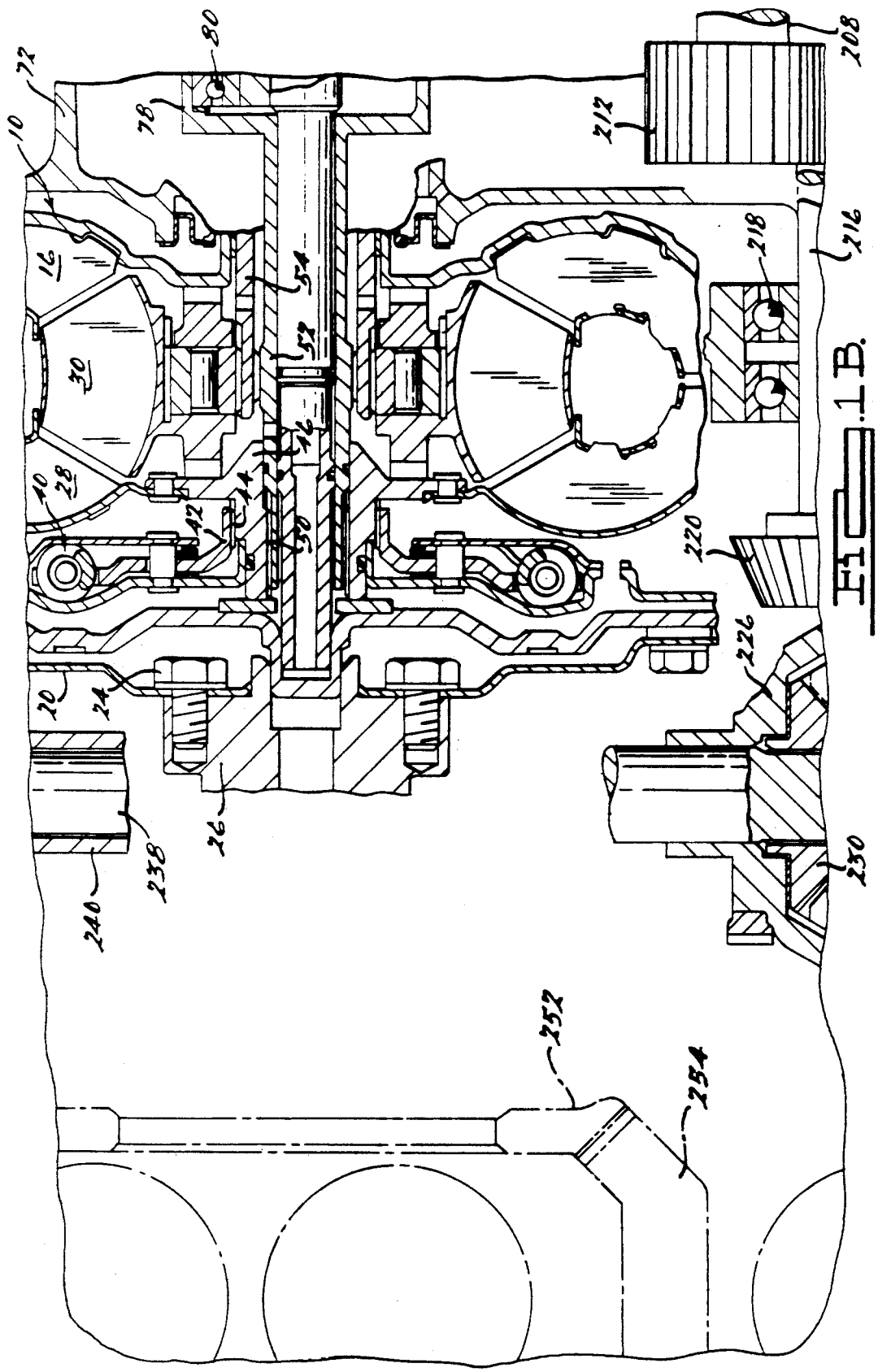
Figure 1D:
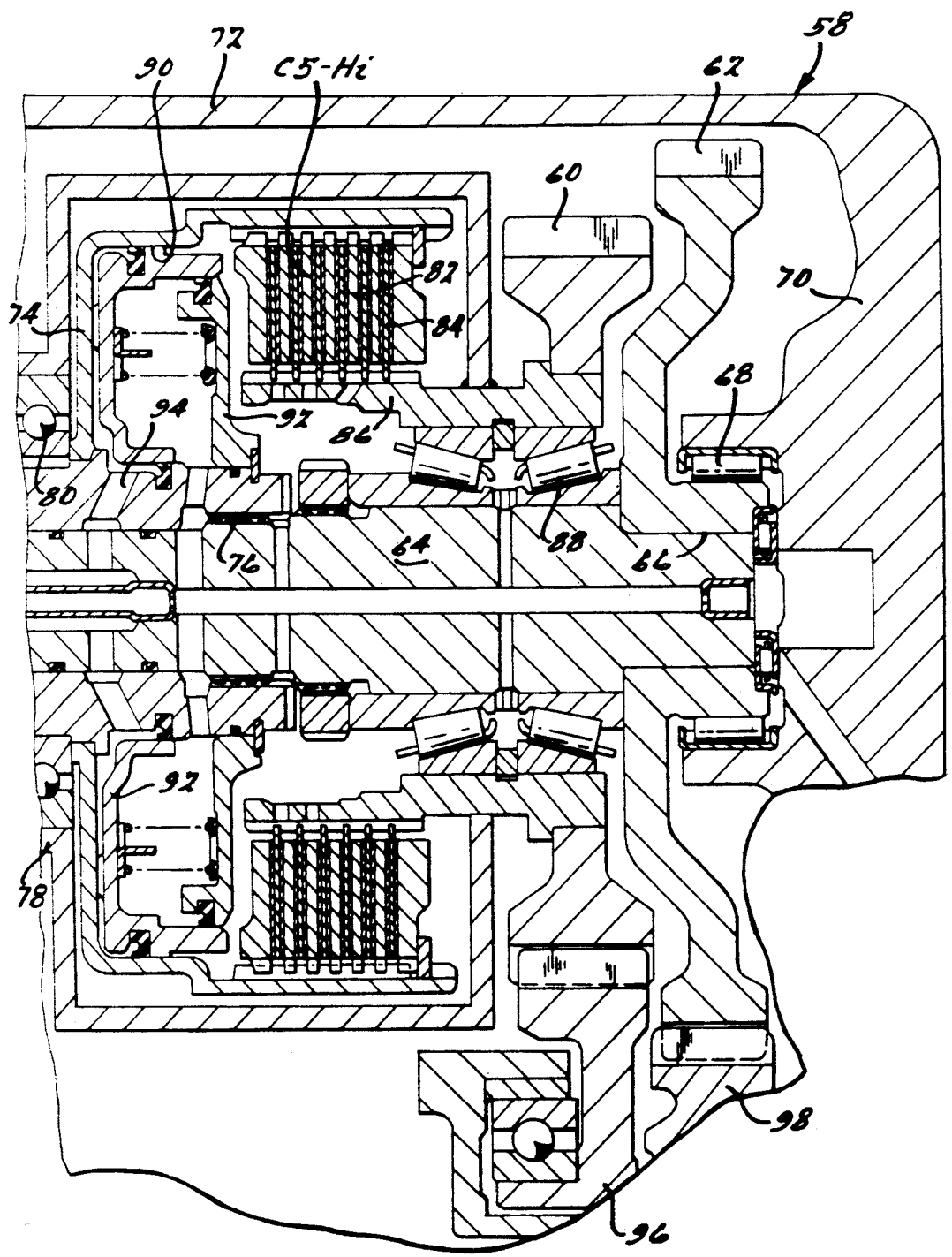
FIG. 1D is a cross-sectional view of a two-speed transfer drive between the torque converter turbine and the multi ra for the powertrain assembly.
Figure 1E:
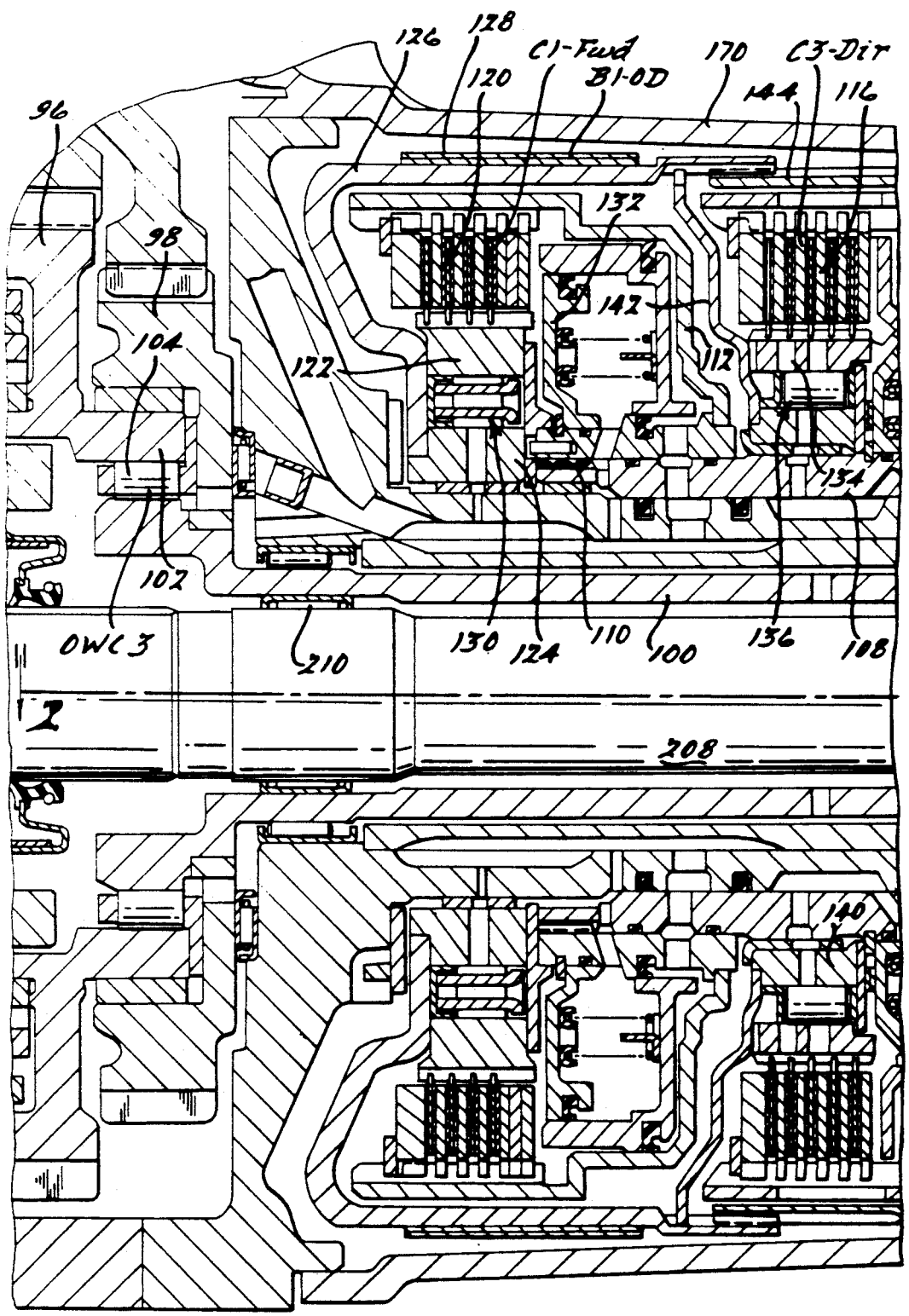
FIGS. 1E, 1F and 1G, taken together, show a cross-sectional view of the rearward geared position of the powertrain assembly.
Figure 1F:
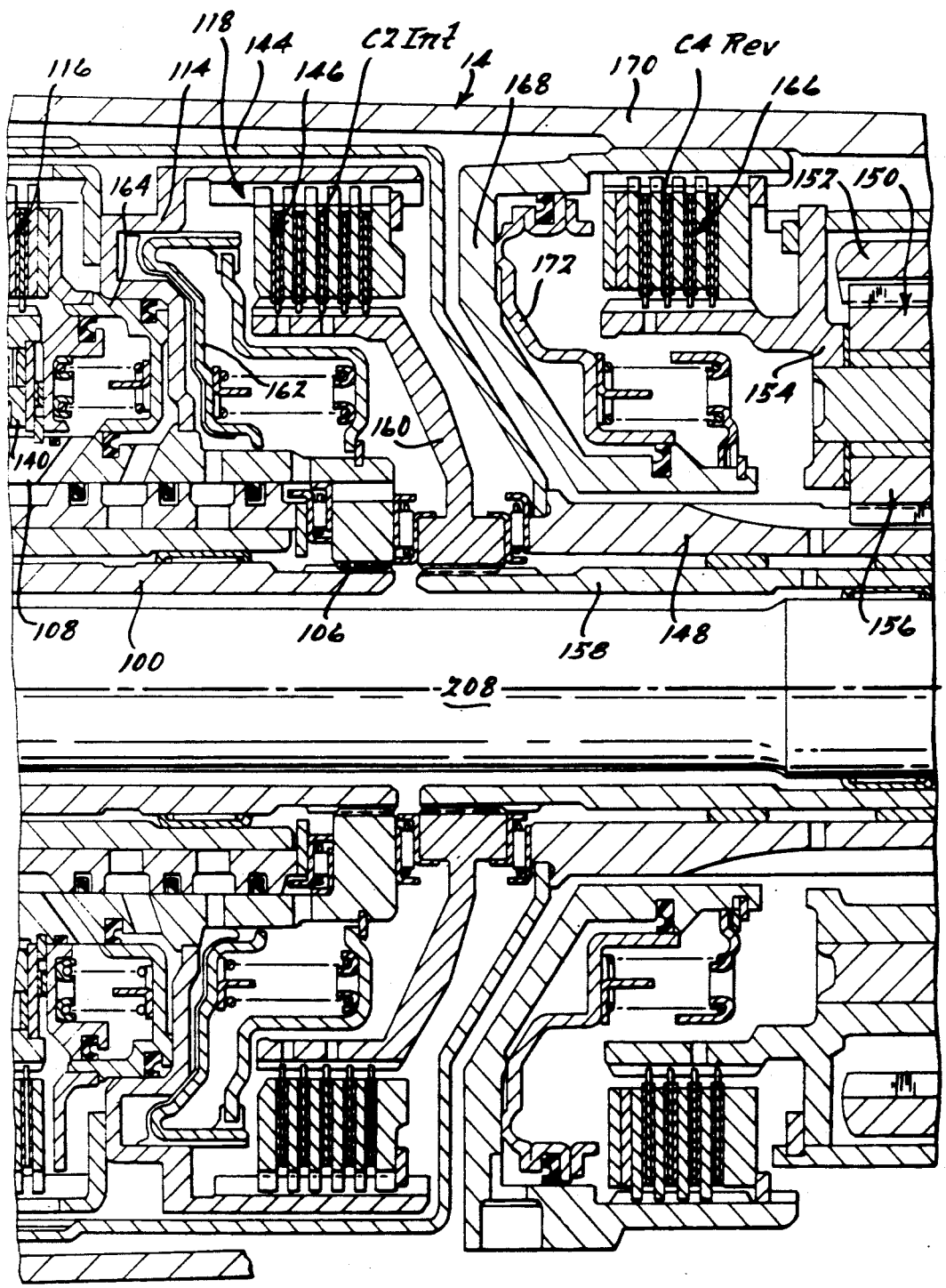

In FIGS. 1A and 1B, reference numeral 10 designates a hydrokinetic torque converter which is disposed in a torque transfer path between an internal combustion engine, schematically shown at 12 in FIG. 1A, and multiple ratio gearing for a planetary transmission designated generally by reference character 14 in FIG. 1F.

In FIGS. 1A and 1B, the impeller of the torque converter 10 is a bladed toroidal fluid flow member 16 having an impeller housing 18. A drive plate 20 is bolted at its outer periphery to the radially outward portion of the impeller housing 18 as shown at 22. A radially inward portion of the drive plate 20 is bolted at 24 to transmission input drive shaft 26, the axis of which is situated perpendicularly with respect to the axis of the crankshaft of the engine 12.

The torque converter 10 includes a turbine 28 and a bladed stator 30 located between the flow exit section of the turbine 28 and the flow entrance section of the impeller 16. Torque converter 10 is situated in a transmission housing portion 32, which is bolted to the engine cylinder housing.

Impeller housing 18, which is located within the transmission housing portion 32, encloses a lockup clutch disc assembly 34 having annular friction surface 36 situated adjacent an annular clutch plate 38 secured to the inner wall of the housing 18. A damper assembly 40 establishes a resilient connection between the clutch disc assembly 34 and clutch plate hub 42, which is splined at 44 to turbine hub 46. Hub 46, in turn, is splined at 50 to turbine sleeve shaft 52.

The converter 10 multiplies torque delivered to the impeller 16. When the speed ratio is high, turbine torque developed by the converter is transferred directly to the turbine sleeve shaft 52. When the lockup clutch is applied, a frictional driving connection is established between friction disc 38 and clutch disc 34. The torque applied to the clutch disc 34 is transferred through tangentially mounted springs of the damper assembly 40 to the clutch plate hub 42 which, as explained, is splined to the turbine hub. This establishes a bypass torque flow path around the hydrokinetic torque flow path of the torque converter 10.

Stator 30 is mounted on stator sleeve shaft 54, and overrunning brake 56 establishes a torque reaction for the stator 30 during operation of the converter in the torque multiplication mode. This accommodates freewheeling motion of the stator 30 in the direction of motion of the impeller and the turbine when the torque converter 10 achieves a high speed ratio coupling point.

A two-speed torque transfer drive mechanism is shown at 58 in FIG. 1D. This includes a first torque transfer gear 60 and a large pitch diameter torque transfer gear 62 which are mounted on drive shaft 64. Large diameter gear 62 is secured at 66 to the drive shaft 64 and is journalled at 68 to end wall 70 of housing portion 72.

Clutch housing 74 is splined at 76 to the shaft 64, which drives gear 62. Clutch housing 74 is journalled on member 78 by bearing 80. Member 78 is connected to turbine sleeve shaft 52 as seen in FIG. 1B. Externally splined clutch discs of a multiple disc clutch assembly 82 are carried by the clutch housing 74 and cooperate with internally splined friction discs 84 secured to clutch member 86. Member 86 is secured to the gear 60, the latter being journalled by tapered roller thrust bearings 88 on shaft 64 as seen in FIG. 1D.

Clutch housing 74 defines an annular cylinder 90 in which is positioned clutch piston 92, which cooperates with cylinder 90 to define a pressure chamber. When fluid pressure is supplied to the pressure chamber through radial passage 94, a hydrostatic force is applied to the piston which engages the friction clutch assembly, thus connecting the shaft 64 to the gear 62.

Gears 60 and 62 mesh, respectively, with gears 96 and 98. Gear 98 is connected directly to torque input shaft 100 for the planetary gear system. An overrunning coupling in the form of a roller clutch is disposed between gear 98 and hub 102, the overrunning coupling being designated by reference numeral 104 as well as the symbol OWC3.

The planetary gear system shown in FIG. 1 is based upon the planetary gear system shown in U.S. Pat. No. 4,509,389. Reference may be made to that patent for the purpose of supplementing this disclosure in order to assist in understanding the mode of operation of the planetary elements of the gear system in FIG. 1.

Figure 1G:
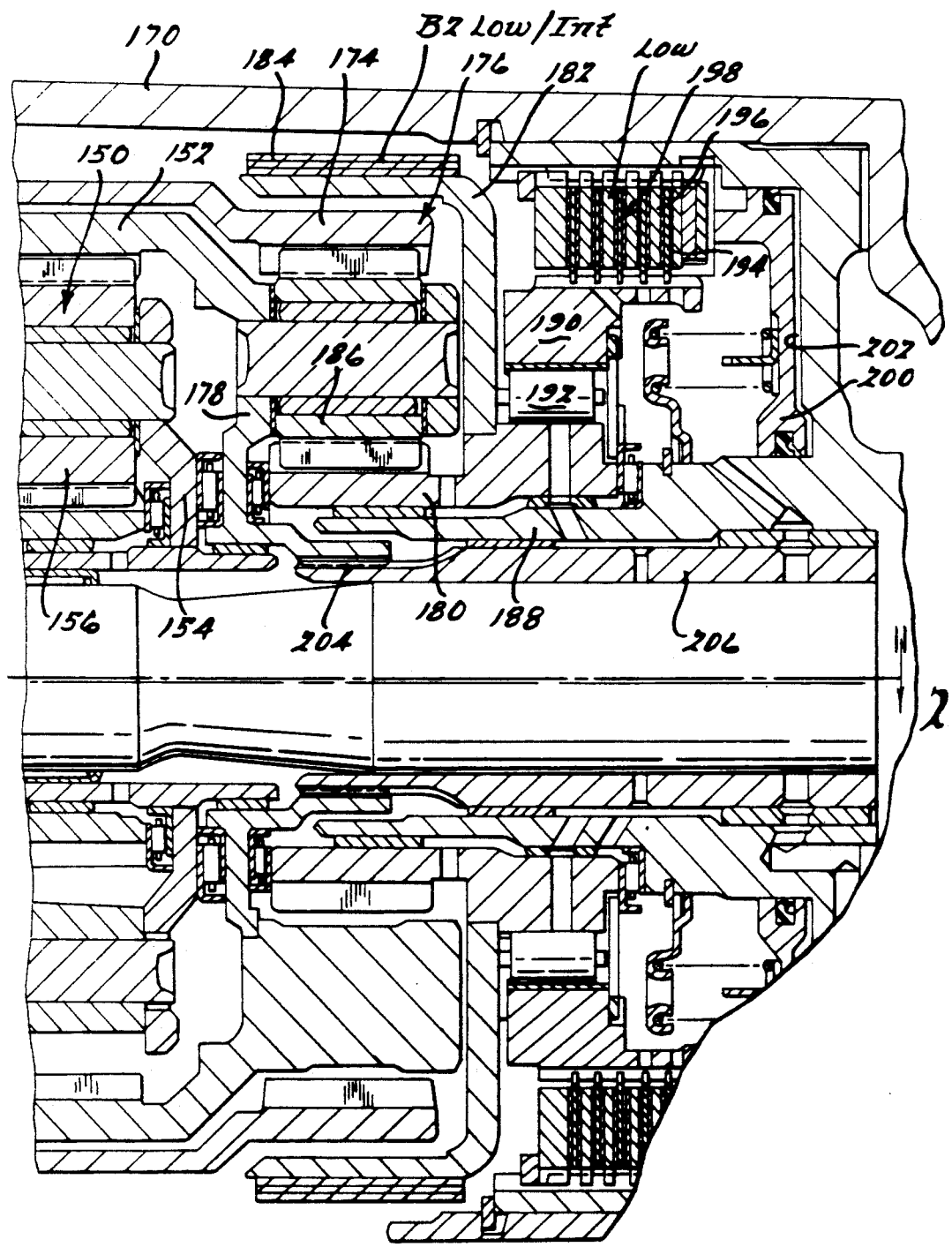

Torque input sleeve shaft 100 in FIGS. 1E, 1F and 1G is splined at 106 to clutch sleeve shaft 108. Sleeve shaft 108 is splined at 110 to forward clutch cylinder 112 and is connected directly also to cylinder housing 114 for direct clutch 116. Housing 114 serves as a cylinder housing also for intermediate clutch 118.

The forward clutch, which is designated generally by reference character 120, comprises discs carried by the clutch housing 112 and companion discs carried by overrunning clutch race 122. The companion inner race 124 is secured to brake drum 126, which is adapted to be anchored by friction brake band 128. Overrunning clutch races 122 and 124 form a part of an overrunning clutch assembly generally designated by reference character 130.

The friction discs of the forward clutch 120 are engaged as pressure is distributed behind annular piston 132 disposed in a cylinder defined by the cylinder housing 112.

The direct clutch 116 comprises friction discs carried by the clutch housing 114 and cooperating friction discs carried by outer overrunning clutch race 134, which forms a part of overrunning coupling 136. The inner race 140 of the overrunning clutch 136 is connected by means of clutch member 142 to the brake drum 126.

Torque transfer member 144, seen in FIGS. 1E and 1F, extends axially and surrounds intermediate clutch 146 and distributes torque to sun gear 148. Sun gear 148 forms a part of a first planetary gear unit 150 which includes also a ring gear 152, carrier 154 and planet pinions 156 carried by the carrier 154 in meshing engagement with the ring gear 152 and the sun gear 148. Carrier 154 is secured to sleeve shaft 158 which is splined to clutch member 160 of the intermediate clutch 146. The clutch 146 includes friction discs carried at its outer periphery. These discs register with clutch discs carried by the cylinder housing 114.

Housing 114 defines an intermediate clutch cylinder which receives annular piston 162. When the pressure chamber defined in part by the piston 162 is pressurized, the piston engages the friction discs of the clutch 146. Similarly, cylinder member 114 defines an annular cylinder that receives annular piston 164. When pressure is admitted to the pressure chamber partly defined by the piston 164, the clutch discs of the direct clutch assembly 116 are frictionally engaged.

Carrier 154 of the planetary gear unit 150 is adapted to be braked by brake disc assembly 166. Brake disc assembly 166 is engaged during reverse drive. It is defined in part by brake cylinder 168 secured to the transmission housing portion 170. Brake cylinder 168 receives annular brake piston 172, which defines a pressure chamber that may be pressurized to effect frictional engagement of the discs of the brake assembly 166.

Carrier 154 is connected drivably to ring gear 174 of the second simple planetary gear unit 176. Ring gear 152 of gear unit 150, shown in FIGS. 1F and 1G, is connected directly to carrier 178 of the gear unit 176. Sun gear 180 of gear unit 176 is connected to brake drum 182, which is adapted to be anchored by brake band 184 during low and intermediate speed ratio operations. Pinions 186 are carried by carrier 178 in meshing engagement with the ring gear 174 and sun gear 180. Sun gear 174 is journalled on support sleeve shaft 188 and is adapted to be connected to brake member 190 through overrunning brake 192.

Brake member 190 carries low speed ratio friction brake discs 194 which cooperate with friction brake discs 196 for a low speed ratio friction brake identified generally by reference character 198. A low speed ratio brake piston 200 is received in brake cylinder 202 formed at one end of the transmission housing 170. When the pressure chamber defined in part by the piston 200 is pressurized, the low speed ratio brake 198 is energized, thus anchoring the sun gear 180.

Carrier 178 is splined at 204 to sleeve 206, which in turn is connected directly to power output shaft 208 extending through the planetary gear units and the transmission clutch and brake assemblies. The left end of output shaft 208, as seen in FIGS. 1B and 1C, is journalled by needle bearing assembly 210, seen in FIG. 1E. The left end of shaft 208 carries power output gear 212 which meshes with output gear 214 mounted on shaft 216.

Shaft 216 is journalled in bearing assembly 218 and is adapted to rotate on an axis that is offset sufficiently from the axis of the torque converter to avoid interference with the impeller housing 18. The left end of the shaft 216 carries output bevel gear 220, which engages drivably ring gear 222 of a front axle differential assembly 224. Bevel ring gear 222 is carried by differential housing 226 which encloses differential side gears 228 and 230. These mesh with spaced differential pinions 232 and 234. Side gear 228 is splined to a first axle half-shaft 236, and side gear 230 is splined to a companion axle half-shaft 238. Half-shaft 238 extends through sleeve shaft 240 in a direction transverse to the axis of the torque converter and is located between the engine 12 and the drive plate 20 of the torque converter.

The outboard end of the sleeve 240 is journalled by bearing 242 in bearing support 244 carried by the transmission housing. One front traction wheel for the vehicle is connected by means of the universal joint, schematically illustrated at 246, to the outboard end of the shaft 238, a splined connection 248 being provided for this purpose.

Shafts 236 and 238 are journalled in their respective sleeve shafts by suitable bushings. A drive plate 20 of the torque converter, as mentioned previously, is connected to the torque input shaft shown at 26 in FIG. 1B. A torque input bevel gear 252 connected to the shaft 26 meshes with crankshaft gear 254, shown schematically in FIGS. 1A and 1B.

In the embodiment of FIGS. 1A through IG, the engine has eight cylinders, as schematically illustrated. Gear 254 is located at the crankshaft center with four cylinders on one side thereof and four cylinders on the opposite side thereof. Crankshaft gear 254 has an axis that coincides with the axis of the crankshaft. It meshes with the gear 252 to form a right angle drive as illustrated. Thus, the offset of the axes of the torque converter and the planetary gearing makes it possible for the gear 254 to be located directly on the center of the crankshaft. This is in contrast to the arrangement shown in my copending application, previously identified, where the axis of the torque input gear for the torque converter is located at the center of the crankshaft axis and the right angle crankshaft gear with which it meshes is offset on the crankshaft an amount equal to the pitch radius of the torque input bevel gear.

Figure 3:
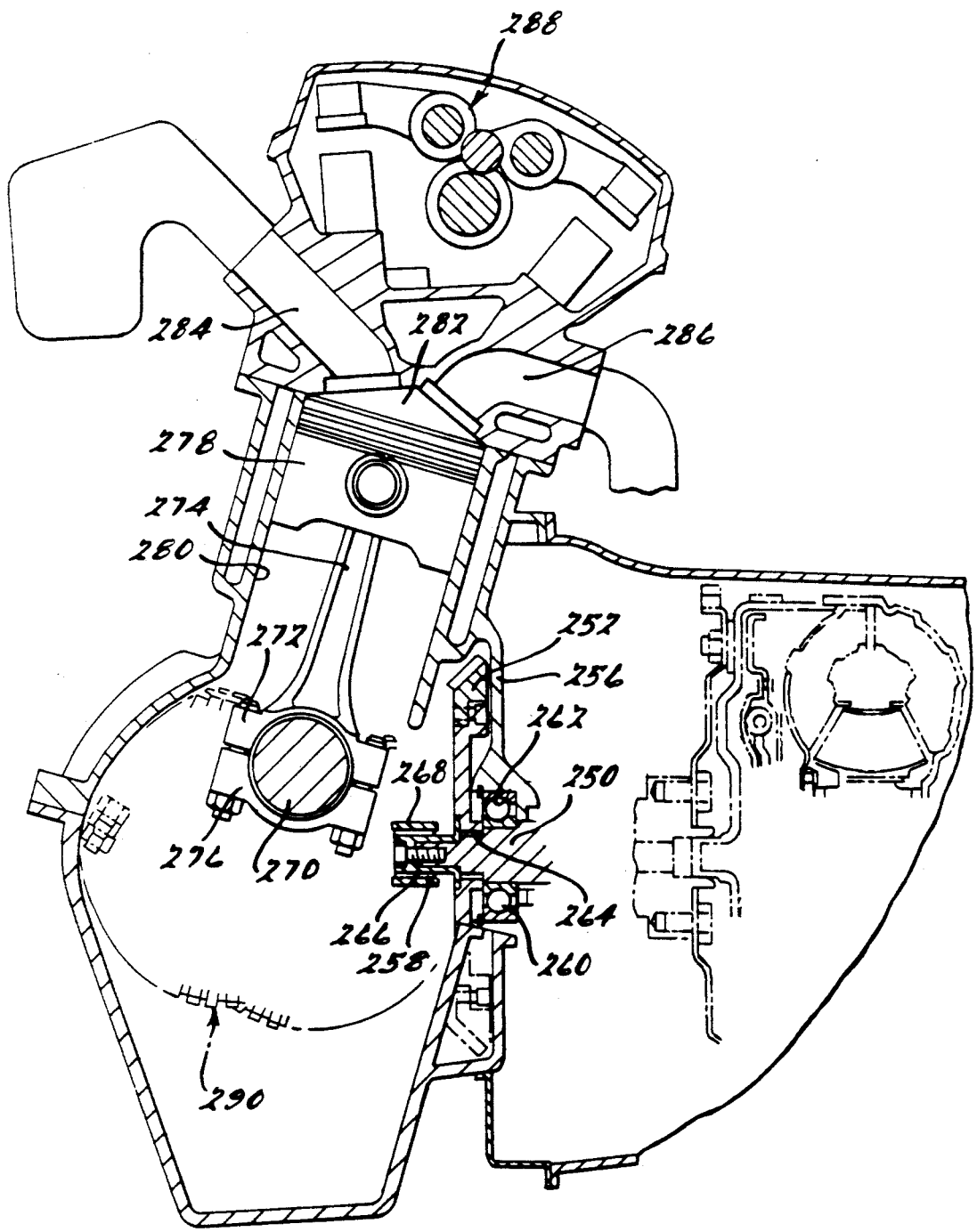
FIG. 3 is a schematic representation of an engine seen generally in cross-section and a torque input bevel gear for t transmission that forms a part of the powertrain assembly of my invention.
Figure 17:
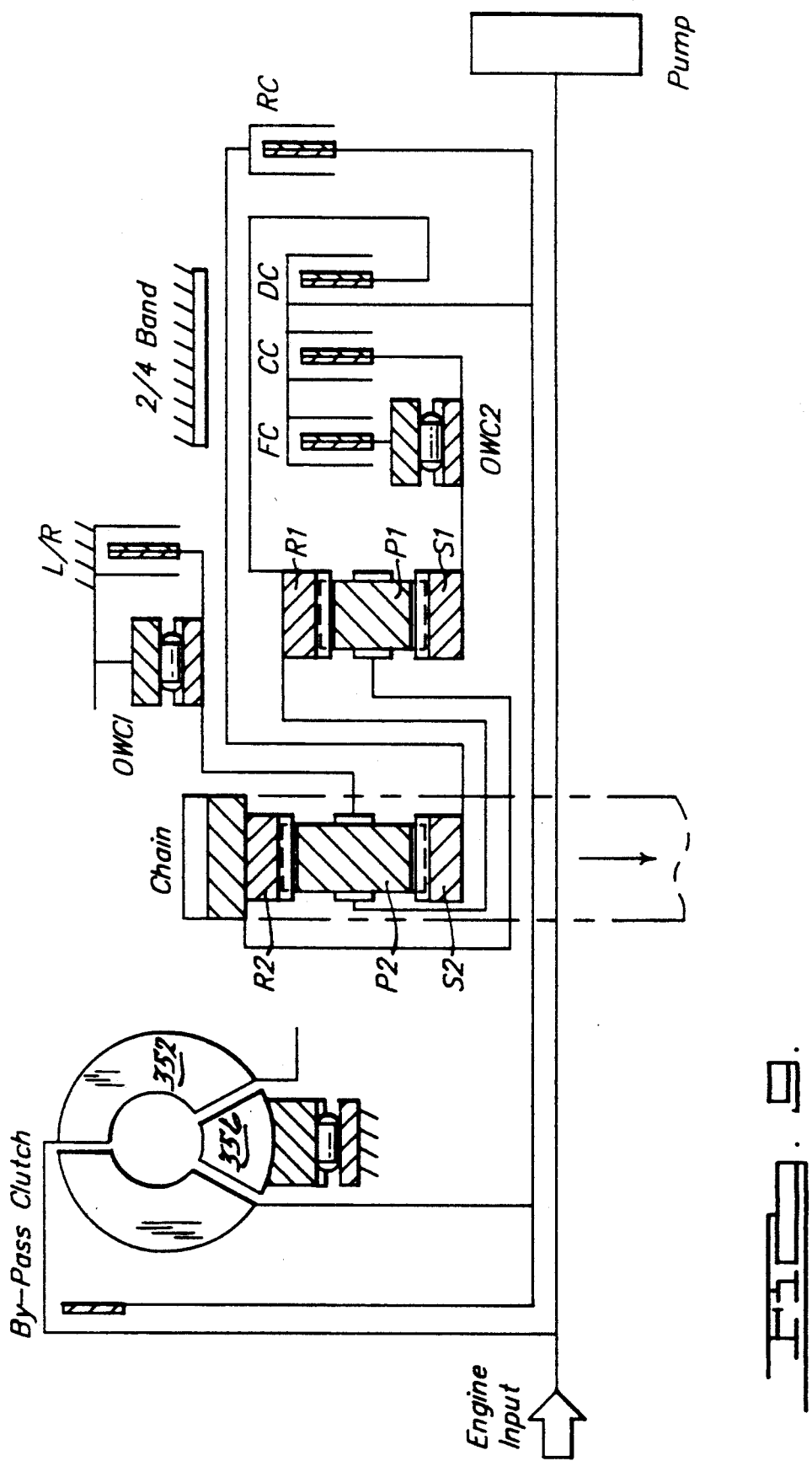

In FIG. 3, we have shown in generally schematic cross-sectional form the relationship of the gear 252 to the crankshaft. When the gear is assembled in this embodiment, the gear 252 is straddle mounted in the transmission housing wall 256. Straddle mounted bearings shown at 258 and 260 are situated on opposite sides of the gear 252. Bearing 260 is located in a bearing opening 262 in the engine housing wall 256. The hub of gear 252 is splined at 264 to the shaft 250, the inboard end 266 of the shaft 250 being supported by the bearing 258, which is located in a bearing opening formed in engine housing boss 268.

The crankshaft, as will be explained with reference to FIGS. 3, 4 and 5, is comprised of crank portions, one of which is shown in FIG. 3 at 270. One end 272 of a piston rod 274 is secured to the crank portion 270 by a crankshaft bearing cap 276. Engine piston 278, which is connected to the piston rod 274, reciprocates in engine cylinder 280, thus creating a combustion chamber of variable volume as shown at 282. Valve ports 284 and 286 communicate with the engine combustion chamber in known fashion. The flow of air-fuel mixture to the combustion chamber and the flow of exhaust gases from the combustion chamber is accommodated by the intake and exhaust ports that register with their respective port openings. Valve operating camshaft and rocker arm assemblies 288 control the operation of the valves (not shown).

The circular path followed by the crankshaft end of the piston rod 274 is illustrated schematically by the family of crankshaft positions illustrated generally by reference character 290.

Shown in FIG. 4 is a six-cylinder engine crankshaft. The crankshaft ends 292 and 294 are supported in known fashion in the engine housing. Bearing portions 296, 298 and 300 are provided at intermediate locations between the crankshaft ends. These register with and are supported by bearing support walls for the engine cylinder block, a portion 302 of the engine support walls being shown in FIG. 4, and a companion bearing support housing portion 304 being located on the opposite side of the crankshaft. Support wall portion 302 registers with bearing portion 306 of the crankshaft, and support wall portion 304 registers with crankshaft bearing support portion 308.

The gear 254 for the crankshaft illustrated in FIG. 4 is secured to the crankshaft generally in the transverse plane of bearing portion 298, which is at the center of the crankshaft. The plane of the pitch diameter for the gear 254 is generally midway between crank portions 310 and 312.

In the six-cylinder crankshaft of FIG. 4, two crank portions 314 and 316 are located on one side of the gear 254 and two other crank portions 318 and 320 are located on the opposite side of the gear 254.

In FIG. 5, I have illustrated a four-cylinder engine crankshaft wherein the crankshaft gear 254 is located at the center of the crankshaft with two crank portions 322 and 324 located on one side of the gear 254 and two other crank portions 326 and 328 located on the opposite side of the gear 254. The end bearing supports 330 and 332 are located at the crankshaft ends. Bearing support 334 is located between the crank portions 324 and 322 and bearing portion 336 is located between the crank portions 328 and 326. The central bearing portion 338 is located generally on the transverse plane of the pitch diameter for the gear 254.

Three of the four cylinders are illustrated only schematically in FIG. 5 and are designated by reference characters 340, 342 and 344. A piston 278 located in the other cylinder is illustrated in FIG. 5 and carries the same reference character used in FIG. 3. Similarly, the same reference characters for designating the piston rod and the crankshaft bearing cap are used in FIG. 3 and 5.

FIG. 6 is a line diagram that shows the clutches and the planetary elements of the gearing in schematic form. This is done to facilitate an understanding of the mode of operation of the gearing. In the schematic representation of FIG. 6, the ring gear for planetary gear unit 150 as designated by the symbol Rl and the sun gear is designated by the symbol Sl. Similarly, the ring gear and the sun gear for gear unit 176 are designated by the reference symbols R2 and S2, respectively. Clutches 102, 130 and 136 are designated respectively by the symbols OWC3, OWC1 and OWC2.

Two output shafts are shown in FIG. 6 but only one would be needed in the present construction. A second output shaft would be required if the transmission were to be adapted for driving torque at both the front and rear wheels.

During forward drive operation, the clutch shown in part at 82 is disengaged. The turbine torque then is delivered directly to the gear 60 through member 78. The torque is transferred then from gear 60 through the overrunning clutch OWC3 to the torque input shaft 100 for the planetary gearing. Clutch C1 is applied as it is during operation and each of the first four forward driving ratios. Overrunning brake OWC4 192, which also carries designation OWC4, and the brake 198 provide a torque reaction for the sun gear S2, which serves as a reaction element during low speed ratio operation. To effect a ratio change to the second ratio from the low speed ratio, clutch C2 is applied together with clutch C1. Although clutch C1 remains applied, torque is not transferred through it since overrunning clutch OWC1 freewheels as torque is transferred directly from the shaft 100 through the engaged clutch C2 to the carrier for the planetary gear unit 150. This drives ring gear R2 for the gear unit 176. With sun gear S2 acting as a reaction point, output shaft 208 is driven with an increased ratio.

Third speed ratio operation is achieved by engaging simultaneously clutches C1 and C2 and the clutch C5, shown in part at 82 in FIG. 1D. This causes turbine torque to be delivered to gear 68 which drives input gear 98, connected directly to the input shaft 100. Under these conditions, overrunning clutch OWC3 free wheels.

A fourth speed ratio is achieved by engaging simultaneously the clutches C1, C2 and C3. This effects a 1:1 ratio in the gear units 150 and 176 as the gear 98 continues to serve as a torque input gear.

In overdrive, clutch C1 is released and the overdrive brake 128, which is designated by the symbol B1 in FIG. 6, is applied. This anchors sun gear S1 for the planetary gear unit 150. The ring gear R1 then is overdriven, which overdrives the output shaft 208.

Reverse drive is obtained by engaging simultaneously brake C4 (also identified as brake 166 in FIG. 1F), the latter anchoring the carrier as sun gear S1 serves as a torque input element. Ring gear R1 then is driven in a reverse direction which drives the output shaft 208 is a reverse direction.

The clutch and brake engagement and release pattern is shown in FIG. 7. Reference may be made to it as well as to the schematic line diagram of FIG. 6 to understand the operation of the planetary elements in each of the ratios.

FIGS. 8A through 8D show a transaxle arrangement using the T-drive configuration wherein the front drive axis is situated between the hydrokinetic torque converter and the engine (not shown). This version of the design differs from the design described with reference to FIGS. 1A through IG because the axis of the hydrokinetic torque converter and the planetary gearing is situated on the vehicle axis and intersects the axis of the crankshaft at a right angle whereby torque is transferred from the torque output element of the planetary gearing through a transfer drive including a drive chain. The driven element of the transfer drive is connected through a spline to an output pinion shaft located in spaced, parallel disposition with respect to the planetary gearing axis where it drivably engages the ring gear of the front axle differential assembly.

In FIGS. 8C and 8D, numeral 350 generally designates a hydrokinetic torque converter having a bladed impeller 352, a bladed turbine 354 and a bladed stator 356. The impeller forms a part of an impeller assembly comprising a housing 358 which is connected to torque input shaft 360 by drive plate 362. Torque input shaft 360 corresponds to the torque input shaft for the T-drive version described with reference to FIGS. 1A through 1G. It is adapted to be driven by a right angle bevel gear which meshes with a crankshaft gear connected drivably to the crankshaft in a manner described in my copending application identified previously.

The gearing arrangement shown in FIGS. 8C and 8D is described in particular detail in U.S. Pat. No. 4,938,097. Reference may be made to that patent for the purpose of supplementing this disclosure in order to assist in an understanding of the torque flow paths that are established by the planetary gearing shown in FIGS. 8C and 8D.

The gearing of FIGS. 8C and 8D includes two simple planetary gear units 364 and 366. Torque is transferred from turbine 354 to torque input sleeve shaft 368, which is connected to clutch sleeve member 370, the connection being established by spline 372. Forward clutch 374 is connected through an overrunning coupling 376 to sun gear 378 for the first planetary gear unit 360. Ring gear 380 of the gear unit 360 is splined at 382 to the carrier 384 of gear unit 364. Planet pinions 386 are journalled on carrier 388 for gear unit 360. Pinions 386 mesh with sun gear 378 and ring gear 380.

Clutch 374 is applied by clutch servo piston 390, which cooperates with the clutch sleeve member 370 to define a pressure chamber. When the pressure chamber is pressurized, the force on the piston 390 is transferred to pressure plate 392 through an extension 394 on the piston 390. The extension 394 passes through the clutch discs of coast clutch 396. Coast clutch 396 forms a bypass torque distribution path around the overrunning coupling 376. When coast braking is desired, clutch 396 is applied by coast clutch servo piston 398 located in an annular cylinder formed in the front clutch piston 390.

Brake band 400 surrounds brake drum 402, which is anchored by the band during second speed ratio operation and fourth speed ratio operation. Brake drum 402 is connected to torque transfer member 404, which is connected to sun gear 406 of planetary gear unit 364. Planetary pinions 408 of gear unit 364 mesh with ring gear 410 and with sun gear 406. These are carried by planet carrier 384.

Carrier 388 of gear unit 360 is connected to ring gear 410 and serves as a torque output element. Drive sprocket 412 is carried by torque output member 414, which is a sleeve that is splined to the carrier 388.

Carrier 384 is adapted to be braked by a friction brake 416 during operation in low and in reverse. An overrunning brake, generally indicated at 418, serves as a reaction torque distribution path in parallel with the friction torque distribution path of the brake 416. It serves to anchor the carrier 384 during low speed ratio operation. The brake 416 is applied by a fluid pressure-operated servo piston 420.

A direct drive clutch 422 establishes a connection between clutch sleeve member 370 and torque transfer member 424, which extends to and is connected with the ring gear 380 of gear unit 360. A reverse clutch 426 is adapted to connect the clutch sleeve member 370 with torque transfer member 404, which extends to the sun gear 406 of gear unit 364.

Shaft 36 is connected to pump drive shaft 428, which extends through the planetary gearing and which is connected drivably to the pump gears of a positive displacement gear pump 430 located at the right-hand end of the transmission housing 432.

The first driving speed ratio is obtained by engaging the forward clutch 374. Clutch 374 is engaged during operation in each of the four forward driving ratios. Turbine torque delivered from the turbine shaft 368 is transferred through the engaged clutch 374 and through overrunning coupling 376 to the sun gear 378. The carrier 384 is anchored by the overrunning brake 418. Thus, the carrier acts as a reaction point as it anchors the ring gear 380 of the gear unit 360. With the sun gear 378 acting as a torque input member, the carrier 388 and the sprocket 412 are driven with a reduced ratio.

A ratio change to the second ratio from the first ratio is obtained by engaging brake band 400 which anchors the sun gear 406. The overrunning brake 418 then begins to free wheel as torque is delivered to the sprocket with an increased ratio.

To obtain third speed ratio, both the direct clutch and the forward clutch are applied so that all of the elements of the gear unit are locked together for rotation in unison.

The fourth ratio is an overdrive ratio which is achieved by anchoring sun gear 406 as brake band 400 is applied. The forward clutch 422 then delivers torque directly to the carrier 384, thus overspeeding the ring gear 410.

Reverse drive is achieved by applying the low-and-reverse brake band 400 by releasing the forward clutch 374 and the direct clutch 422 and applying the reverse clutch 426. Turbine torque then is delivered directly to the clutch element 370 and through the engaged reverse clutch 426 to the torque transfer member 404, thus driving the sun gear 406. Brake 416 is applied so the carrier 384 acts as a reaction point as the ring gear 410 is driven in a reverse direction.

Drive sprocket 412 is generally in transverse alignment with driven sprocket 432. A drive chain connects drivably the sprockets 412 and 432 a portion of the drive chain being shown at 434.

Sprocket 432 is splined at 436 to output shaft 438. It is journalled by bearing 440 in a bearing opening 442 in the transmission housing 432. Shaft 438 is supported by spaced, tapered roller bearings 444 and 446. The inboard end of the shaft 438 carries bevel drive pinion 448 which meshes with differential ring gear 450 of the front axle and differential assembly generally indicated at 452. Assembly 452 functions in a manner similar to that of the front axle and differential assembly of the embodiment described with reference to FIGS. 1A through 1G.

Ring gear 450 is carried by differential housing 454 which is mounted for rotation about the axis of front wheel drive shaft 456 extending to one traction wheel. The common axis of axle shaft 458 extends to the other front drive wheel. Differential housing 454 carries pinions 460 and 462 which mesh with side gears 464 and 466, which in turn drive the axle shafts.

The displacement of the axis of shaft 438 with respect to the axis of the planetary gearing is sufficient to avoid interference between the torque converter and the torque flow path extending to the differential assembly 452 from the driving sprocket 412.

FIG. 9 is a schematic representation of the planetary gearing of FIG. 8C. In FIG. 9, direct clutch 422 carries a designation DC, reverse clutch 426 carries a designation RC, coast clutch 396 carries a designation CC, forward clutch carries a designation FC, the low-and-reverse brake 416 carries a designation LR, the overrunning clutch 418 carries a designation OWC1 and the overrunning clutch 376 carries a designation OWC2.

FIG. 8 shows a clutch and brake engagement and release pattern for the gear system schematically illustrated in FIG. 10. It shows the brakes and the clutches that are applied or released to establish each of the forward driving ratios as well as a reverse ratio. The symbols used in FIG. 8 correspond to the designations for the friction elements and the overriding clutches used in the schematic arrangement of FIG. 10 so that the mode of operation indicated in FIG. 8 can be correlated with the schematic diagram of FIG. 10.

Having described preferred embodiments of my invention, what I claim and desire to secure by United States Letters Patent is:

1. A T-drive vehicle powertrain assembly comprising an internal combustion engine with a crankshaft, a drive gear connected to and rotatable in unison with said crankshaft about the axis of the cranks haft at a location intermediate the crankshaft ends;
   a power transmission mechanism comprisinga hydrokinetic torque converter with an impeller and a turbine in fluid flow relationship and a gear system having a power input shaft mounted on an axis substantially perpendicular to said crankshaft axis, a power output shaft of said transmission being adapted to be connected to vehicle traction wheels;
   said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;
   a driven gear connected drivably to said impeller and meshing with said drive gear whereby said engine and said transmission mechanism form a compact, unitary drive assembly, said power input shaft being connected drivably to said turbine;
   said transmission power output shaft extending toward said driving gear; and
   a final transaxle gear drive located between said engine and said torque converter and having differential gearing with axle drive gears, a geared connection between said power output shaft and separate ones of said axle drive gears, each axle drive gear being adapted to be connected drivably to an axle shaft.

2. The combination as set forth in claim 1 wherein said driving gear is mounted on an axis in spaced, parallel disposition with respect to the axis of said gear system; and
   further including a torque transfer drive means for establishing a torque flow path between said axes.

3. The combination as set forth in claim 2 wherein said torque transfer drive means comprises gears defining plural ratios and a controllable clutch means for selectively establishing each of said ratios.

4. A T-drive for a vehicle having an internal combustion engine with a crankshaft axis disposed transversely with respect to a fore-and-aft vehicle geometric axis, said vehicle having at least one set of traction wheels;
   a transmission having multiple ratio gearing, a tor4que converter having an impeller and a turbine, a power input shaft connected drivably to said impeller, said turbine being connected to torque input portions of said multiple ratio gearing, a power output shaft drivably connected to power output portions of said gearing and adapted to transfer torque to said traction wheels;

cross-axis gearing drivably connecting said crankshaft to said impeller comprising a drive gear connected directly to said crankshaft intermediate its ends and a driven gear engaging said drive gear, said driven gear being drivably connected to said impeller;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said transmission power output shaft extending toward said driven gear; and a final transaxle gear drive located between said engine and torque converter having differential gearing with axle drive gears, a geared connection between said power output shaft and separate ones of said axle drive gears, each axle drive gear being adapted to be connected drivably to an axle shaft.

5. The combination as set forth in claim 4 wherein said driving gear is mounted on an axis in spaced, parallel disposition with respect to the axis of said gear system; and further including a torque transfer drive means for establishing a torque flow path between said axes.

6. The combination as set forth in claim 5 wherein said torque transfer drive means comprises gears defining plural ratios and a controllable clutch means for selectively establishing each of said ratios.

7. A powertrain for a wheeled vehicle comprising an internal combustion engine and a transmission including an torque converter with an impeller, a turbine, and multiple ratio gearing, said engine and transmission including a common, multiple-part housing;

said engine having a crankshaft adapted to be mounted transversely with respect to a fore-and-aft geometric center plane for said vehicle;

said transmission having a power output shaft extending toward said crankshaft in a substantially perpendicular direction with respect to the axis of said crankshaft; a final transaxle gear drive located between said engine and said torque converter having differential gearing with axle drive gears, a geared connection between power output portions of said transmission and separate ones of said axle drive gears, each axle drive gear being adapted to be connected drivably to an axle shaft; and cross-axle gearing including a bevel drive gear connected to and rotatable with said crankshaft at a position on said crankshaft intermediate its ends, and a bevel driven gear meshing with said bevel drive gear, said bevel driven gear being drivably connected to said impeller, said turbine being connected to torque input portions of said multiple ratio gearing and being disposed substantially at a right angle with rsepect to said crankshaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided.

8. The combination as set forth in claim 7 wherein said driving gear is mounted on an axis in spaced, parallel disposition with respect to the axis of said gear system; and further including a torque transfer drive means for establishing a torque flow path between said axes.

9. The combination as set forth in claim 8 wherein said torque transfer drive means comprises gears defining plural ratios and a controllable clutch means for selectively establishing each of said ratios.

10. An engine and transmission assembly for a wheeled vehicle comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;

a transmission including a torque converter with an impeller and a turbine and having gearing arranged on a gearing axis generally on said vehicle center plane, said transmission having a housing joined to said cylinder housing to form a unitary T-drive assembly;

a torque input driven gear drivably connected to said impeller, said turbine being connected to torque input portions of said transmission, torque output portions of said transmission being adapted to deliver torque to vehicle traction wheels;

said torque output portions of said transmission including a torque output shaft extending in a direction generally perpendicular to the axis of said crankshaft;

a final transaxle gear drive located between said engine and said torque converter and having differential gearing with axle drive gears, a geared connection between said torque output shaft and separate ones of said axle drive gears, each axle drive gear being adapted to be connected drivably to an axle shaft; and a crankshaft drive gear connected to said crankshaft intermediate the crankshaft ends directly adjacent one of said bearing portions, said crankshaft gear being drivably engaged wtih said torque input driven gear whereby the overall length of said unitary T-drive assembly is minimized and whereby the height of said engine is lowered relative to the axis of said gearing;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided.

11. The combination as set forth in claim 10 wherein said driving gear is mounted on an axis in spaced, parallel disposition with respect to the axis of said gear system; and further including a torque transfer drive means for establishing a torque flow path between said axes.

12. The combination as set forth in claim 11 wherein said torque transfer drive means comprises gears defining plural ratios and a controllable clutch means for selectively establishing each of said ratios.

13. A T-drive for a vehicle having an internal combustion engine with a crankshaft axis disposed transversely with respect to a fore-and-aft vehicle geometric axis, said vehicle having at least one set of traction wheels;

a transmission having a hydrokinetic torque converter with an impeller and a turbine and multiple ratio gearing, a power input shaft connected drivably to said impeller, said turbine being connected to torque input portions of said gearing, a power output shaft drivably connecting power output portions of said gearing and adapted to transfer torque to said traction wheels; and cross-axis gearing drivably connecting said crankshaft to torque input portions of said multiple ratio gearing, said cross-axis gearing comprising a drive gear connected directly to said crankshaft intermediate its ends and a driven gear engaging said drive gear, said driven gear being connected to said power input shaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said transmission power output shaft extending coaxially through said multiple ratio gearing toward said riven gear; and a right angle drive located between said engine and said torque converter having a transaxle differential gear unit with two axle drive gears, a geared connection between said power output shaft and said axle drive gears, each axle drive gear being adapted to drive an axle half-shaft.

14. A powertrain for a wheeled vehicle comprising an internal combustion engine and a multiple ratio transmission, said transmission comprising a hydrokinetic torque converter with an impeller and a turbine and planetary gearing, said engine and transmission including a common, multiple-gear housing, said engine having a crankshaft adapted to be mounted transversely with respect to a fore-and-aft geometric center plane for said vehicle;

cross-axle gearing including a bevel drive gear connected to and rotatable with said crankshaft at a position on said crankshaft intermediate its ends, and a bevel driven gear meshing with said bevel drive gear, said bevel driven gear being connected to said impeller, said turbine being connected to torque input portions of said gearing and being disposed substantially at a right angle with respect to said crankshaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said transmission having a torque output shaft extending coaxially therethrough toward said bevel driven gear;

a right angle drive located between said engine and said torque converter having a transaxle differential gear unit with two axle drive gears; and a geared connection between power output portions of said transmission and said axle drive gears, each axle drive gear being adapted to drive an axle half-shaft.

15. An engine and transmission assembly for a wheeled vehicle comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;

a transmission comprising a hydrokinetic torque converter with an impeller and a turbine and having gearing arranged on a gearing axis generally on said vehicle center plane, said transmission having a housing joined to said cylinder housing to form a uniary T-drive assembly;

a torque input driven gear connected to said impeller, said turbine being connected to torque input portions of said gearing, torque output portions of said transmission being adapted to deliver torque to vehicle traction wheels; and a crankshaft drive gear connected to said crankshaft intermediate the crankshaft ends directly adjacent one of said bearing poertions, said crankshaft drive gear being drivably engaged with said torque input driven gear whereby the overall length of said unitary T-drive assembly is minimized and whereby the height of said engine is lowered relative to the axis of said gearing;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said transmission torque output portions including a power output shaft extending coaxially through said gearing toward said crankshaft gear; and a right angle drive located between said engine and said torque converter having a transaxle differential gear unit with two axle drive gears, a geared connection between said power output shaft and said axle drive gars, each axle drive gear being adapted to drive an axle half-shaft.

16. A T-drive for a vehicle having an internal combustion engine with a crankshaft axis disposed transversely with respect to a fore-and-aft vehicle geometric axis, said vehicle having at least one set of traction wheels;

a transmission including a hydrokinetic torque converter with an impeller and a turbine and having multiple ratio gearing, a power input shaft connected drivably to said impeller, said turbine being connected to torque input portions of said multiple ratio gearing, a power output shaft drivably connected to power output portions of said gearing and adapted to transfer torque to said traction wheels; and cross-axis gearing comprising a drive gear connected directly to said crankshaft intermediate its ends and a driven gear engaging said drive gear, said driven gear being connected to said impeller;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said crankshaft having multiple crankshaft bearings including a bearing at each crankshaft end and a bearing near a mid-position on said crankshaft whereby a near midposition nodal point is established thus increasing crankshaft torsional stiffness;

said transmission power output shaft extending coaxially through said multiple ratio gearing toward said driven gear; and a right angle drive located between said engine and said torque converter having a transaxle differential gear unit with two axle drive gears, a geared connection between said power output shaft and said axle drive gears, each axle drive gear being adapted tod rive an axle half-shaft.

17. A powertrains for a wheeled vehicle comprising an internal combustion engine and a multiple ratio transmission, said transmission including a hydrokinetic torque converter with an impeller and a turbine and having multiple ratio gearing, said engine and transmission including a common, multiple-part housing, said engine having a crankshaft adapted to be mounted transversely with respect to a fore-and-aft geometric center plane for said vehicle;

cross-axis gearing including a bevel drive gear connected to and rotatable with said crankshaft at a position on said crankshaft intermediate its ends, and a bevel driven gear meshing with said bevel drive gear, said bevel driven gear being connected to said impeller, said turbine being connected to torque input portions of said gearing and being disposed substantially at a right angle with respect to said crankshaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said crankshaft having multiple crankshaft bearings including a bearing at each crankshaft end and a bearing near a mid-position on said crankshaft whereby near mid-position nodal point is established thus increasing crankshaft torsional stiffness;

said transmission having a torque output shaft extending coaxially therethrough toward said bevel driven gear;

a right angle drive located between said engine and said torque converter having a transaxle differential gear unit with two axle drive gears; and a geared connection between power output portions of said transmission and said axle drive gears, each axle drive gear being adapted to drive one axle half-shaft.

18. An engine and transmission assembly for a wheeled vehicle comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;

a transmission including a hydrokinetic torque converter having gearing arranged on a gearing axis generally on said vehicle center plane, said transmission having a housing joined to said cylinder housing to form a unitary T-drive assembly;

a torque input driven gear connected to said impeller, said turbine being connected to torque input portions of said gearing, torque output portions of said transmission being adapted to deliver torque to vehicle traction wheels; and a crankshaft drive gear connected to said crankshaft intermediate the crankshaft ends directly adjacent one of said bearing portions, said crankshaft gear being drivably engaged with said torque input driven gear whereby the overall length of said unitary T-drive assembly is minimized and whereby the height of said engine is lowered relative to the axis of said gearing;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said crankshaft having multiple crankshaft bearings including a bearing at each cranksahft end and a bearing near a mid-position on said crankshaft whereby a near mid-position nodal point is established thus increasing crankshaft torsional stiffness;

said transmission having a torque output portions including a power output shaft extending coaxially through said gearing toward said crankshaft gear; and a right angle drive located between said engine and said torque converter having a transaxle differential gear unit with two axle drive gears, a geared connection between power output shaft and said axle drive gears, each axle drive gear being adapted to drive an axle half-shaft.

* * * * *

UNITED STATES PATENT AND TRADEMARK OFFICE
CERTIFICATE OF CORRECTION

PATENT NO. : 5,180,346

DATED : January 19, 1993

INVENTOR(S) : Donald L. Carriere

It is certified that error appears in the above-identified patent and that said Letters Patent is hereby corrected as shown below:

Col. 1, line 14, delete "For" and insert --Form--.

Col. 3, line 53, delete "Multi ra" and insert --Multiple ratio--.

Col. 3, line 63, delete "t transmission" and insert --the transmission--.

Col. 3, line 67, After "position" insert --on--.

Col. 6, line 34, delete "IG" and insert --1G--.

Col. 7, line 23, delete "IG" and insert --1G--.

Col. 12, line 16, claim 1, delete "Comprisinga" and insert -- comprising a--.

Col. 12, line 64, claim 4, delete "tor4que" and insert --torque--.

Col. 13, line 56, claim 7, delete "cross-axle" and insert --cross-axis--.

Col. 13, line 64, claim 7, delete "rsepect" and insert --respect--.

Col. 15, line 42, claim 13, delete "riven" and insert --driven--.

Col. 16, line 32, claim 15, delete "uniary" and insert --unitary--.

Col. 16, line 40, claim 15, delete "poertions" and insert --portions--.

Col. 16, line 64, claim 15, delete "gars" and insert --gears--.

Col. 17, line 31, claim 16, delete "midposition" and insert --mid-position--.

Col. 17, line 41, claim 16, delete "tod rive" and insert --to drive--.

Col. 17, line 42, claim 17, delete "powertrains" and insert --powertrain--.

UNITED STATES PATENT AND TRADEMARK OFFICE
CERTIFICATE OF CORRECTION

PATENT NO. : 5,180,346

DATED : January 19, 1993

INVENTOR(S) : Donald L. Carriere

It is certified that error appears in the above-identified patent and that said Letters Patent is hereby corrected as shown below:

Col. 18, line 54, claim 18, delete "cranksahft" and insert --crankshaft--.

Col. 14, line 9, claim 8, delete "Driving gear" and insert --Turbine--.

Col. 14, lines 10-11, claim 8, delete "Gearsystem" and insert --Multiple Ratio Gearing--.

Col. 14, line 68, claim 11, delete "Driving Gear" and insert --turbine--.

Col. 15, lines 1-2, claim 11, delete "Gear system" insert --transmission gearing--.

Signed and Sealed this

Fifteenth Day of February, 1994

Attest:

BRUCE LEHMAN

Attesting Officer

Commissioner of Patents and Trademarks